US012341264B2

(12) United States Patent
Wu et al.

(10) Patent No.: US 12,341,264 B2
(45) Date of Patent: Jun. 24, 2025

(54) ANTENNA APPARATUS AND ELECTRONIC DEVICE

(71) Applicant: HUAWEI TECHNOLOGIES CO., LTD., Shenzhen (CN)

(72) Inventors: Pengfei Wu, Shanghai (CN); Hanyang Wang, Reading (CN); Dong Yu, Shanghai (CN); Chien-Ming Lee, Shenzhen (CN); Liang Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 18/009,810

(22) PCT Filed: Jun. 15, 2021

(86) PCT No.: PCT/CN2021/100089
§ 371 (c)(1),
(2) Date: Dec. 12, 2022

(87) PCT Pub. No.: WO2021/254322
PCT Pub. Date: Dec. 23, 2021

(65) Prior Publication Data

US 2023/0246335 A1 Aug. 3, 2023

(30) Foreign Application Priority Data

Jun. 15, 2020 (CN) ......................... 202010544996.8

(51) Int. Cl.
*H01Q 5/50* (2015.01)
*H01Q 1/24* (2006.01)
(Continued)

(52) U.S. Cl.
CPC ............... *H01Q 5/50* (2015.01); *H01Q 1/243* (2013.01); *H01Q 1/521* (2013.01); *H01Q 5/335* (2015.01)

(58) Field of Classification Search
CPC ...... H01Q 1/243; H01Q 1/52; H01Q 5/30-35; H01Q 5/50
See application file for complete search history.

(56) References Cited

U.S. PATENT DOCUMENTS 8,942,761 B2 * 1/2015 Vance .................. H01Q 9/0421 343/857
9,379,455 B2 6/2016 Sonnerat et al.
(Continued)

FOREIGN PATENT DOCUMENTS

CN 105680159 A 6/2016
CN 108270082 A 7/2018
(Continued)

*Primary Examiner* — Hasan Islam

(57) ABSTRACT

An antenna apparatus and an electronic device. The antenna apparatus includes a feed source, a transmission line, a first radiator including a first feed point, and a second radiator including a second feed point. The transmission line is electrically connected to the feed source. A second end part of the second radiator is disposed away from the first radiator compared to the first end part of the second radiator, a first gap is formed between the first end part of the first radiator and the first end part of the second radiator, the first end part of the first radiator is a ground end, and the first end part of the second radiator is an open end. The two feed points are electrically connected to the transmission line, and the transmission line input a radio frequency signal in a same frequency band to the two feed points.

20 Claims, 31 Drawing Sheets

(51) Int. Cl.
*H01Q 1/52* (2006.01)
*H01Q 5/335* (2015.01)

(56) References Cited

U.S. PATENT DOCUMENTS

| | | | | |
|---|---|---|---|---|
| 10,340,592 | B2 * | 7/2019 | Nam | H01Q 1/243 |
| 2016/0301145 | A1 | 10/2016 | Lee et al. | |
| 2016/0365622 | A1 * | 12/2016 | Na | H01Q 5/35 |
| 2018/0053990 | A1 * | 2/2018 | Caballero | H01Q 9/42 |
| 2019/0260112 | A1 * | 8/2019 | Azad | H01Q 9/42 |
| 2020/0007184 | A1 * | 1/2020 | Jung | H04B 1/525 |

FOREIGN PATENT DOCUMENTS

| | | | |
|---|---|---|---|
| CN | 208570942 | U | 3/2019 |
| CN | 209072551 | U | 7/2019 |
| CN | 110247160 | A | 9/2019 |
| CN | 110998973 | A | 4/2020 |
| CN | 111180872 | A | 5/2020 |
| CN | 111193110 | A | 5/2020 |

* cited by examiner

ANTENNA APPARATUS AND ELECTRONIC DEVICE

CROSS-REFERENCE TO RELATED APPLICATIONS

This application is a National Stage of International Application No. PCT/CN2021/100089 filed on Jun. 15, 2021, which claims priority to Chinese Patent Application No. 202010544996.8, filed on Jun. 15, 2020, both of which are hereby incorporated by reference in their entireties.

TECHNICAL FIELD

This application relates to the field of antenna technologies, and in particular, to an antenna apparatus and an electronic device.

BACKGROUND

With rapid development of key technologies such as a bezel-less screen, lightness and thinness, and a highest screen-to-body ratio of an electronic device, such as a mobile phone, have become a trend. In such design, antenna arrangement space is greatly reduced. In such an environment in which antennas are tightly arranged, it is difficult for a conventional antenna to meet a performance requirement of a plurality of communication frequency bands. In addition, for communication frequency bands of mobile phones, 3G, 4G, and 5G frequency bands will coexist for a long time, a quantity of antennas is increasing, and frequency band coverage will be further extended. Based on these changes, it is urgent to implement a new type of antenna that occupies a small area and a wide frequency band range on a mobile phone.

SUMMARY

This application provides an antenna apparatus and an electronic device. The antenna apparatus occupies a small area, and can excite a plurality of resonance modes, to obtain a wide frequency band range.

According to a first aspect, this application provides an antenna apparatus. The antenna apparatus includes a feed source, a transmission line, a first radiator, and a second radiator. The transmission line is electrically connected to the feed source. The first radiator includes a first end part and a second end part. The second radiator includes a first end part and a second end part. The first end part of the second radiator is disposed close to the first end part of the first radiator, the second end part of the second radiator is disposed away from the first radiator, a first gap is formed between the first end part of the first radiator and the first end part of the second radiator, the first end part of the first radiator is a ground end, and the first end part of the second radiator is an open end, that is, the first end part of the second radiator is not grounded.

The first radiator includes a first feed point, the second radiator includes a second feed point, the first feed point and the second feed point are both electrically connected to the transmission line, and the transmission line is configured to input a radio frequency signal in a same frequency band to the first feed point and the second feed point.

It may be understood that, when the first gap is formed between the first end part of the first radiator and the first end part of the second radiator, the second radiator is disposed close to the first radiator. In this case, the first radiator and the second radiator of the antenna apparatus are disposed more compactly, to reduce occupied space of the composite antenna to a large extent.

In addition, the first end part of the first radiator is disposed as the ground end, and the ground end of the first radiator is disposed close to the open end (the first end part) of the second radiator, to effectively implement that the antenna apparatus still has high isolation in a compact design, so as to ensure that the antenna apparatus has better antenna performance.

In addition, compared with the conventional technology in which one resonance mode is excited by an IFA, a quantity of resonance modes excited by the antenna apparatus in this solution is increased by one. In this case, the composite antenna can implement wide frequency band coverage. In addition, when the antenna apparatus in this solution is in a free space environment, a beside head and hand left environment, or a beside head and hand right environment, the antenna apparatus has high system efficiency and a large frequency band bandwidth. In addition, there is a small difference between the system efficiency of the antenna apparatus in the beside head and hand left environment and the system efficiency of the antenna apparatus in the beside head and hand right environment. Therefore, the antenna apparatus in this solution can better meet requirements of electronic device communications systems.

In an implementation, a width d1 of the first gap satisfies: $0<d1\leq 10$ millimeters. In this way, the second radiator can be disposed close to the first radiator to a greater extent, that is, the first radiator and the second radiator are disposed compactly, to reduce space occupied by the first radiator and the second radiator.

In an implementation, both the first radiator and the second radiator generate at least one resonance mode under the radio frequency signal. In this way, the composite antenna can implement wide frequency band coverage, that is, a frequency band range is wide.

In an implementation, the frequency band of the radio frequency signal is within a range from 600 megahertz to 1000 megahertz.

In an implementation, a ratio of a length of the first radiator to a length of the second radiator is within a range from 0.8 to 1.2. It may be understood that, the ratio of the length of the first radiator to the length of the second radiator is set within the range from 0.8 to 1.2, to help both the first radiator and the second radiator excite a resonance mode under the radio frequency signal in the same frequency band.

In an implementation, a length of the first radiator between the first feed point and the ground end of the first radiator is less than or equal to half of a total length of the first radiator. In this way, the first feed point is disposed close to the second radiator. A length of the transmission line can be set to be smaller, to facilitate a miniaturization design of the composite antenna, and further reduce an occupied area of the composite antenna.

In an implementation, a length of the first radiator between the first feed point and the ground end of the first radiator is greater than half of a total length of the first radiator. In this way, the first feed point is disposed away from the second radiator. A length of the transmission line can be set to be large. In this case, a location of the feed source is more flexible.

In an implementation, the second end part of the second radiator is a ground end. In an implementation, a length of the second radiator between the second feed point and the ground end of the second radiator is greater than half of a total length of the second radiator. In this way, the second feed point is disposed close to the first radiator. A length of the transmission line can be set to be smaller, to facilitate a miniaturization design of the composite antenna, and further reduce an occupied area of the composite antenna.

In an implementation, the second end part of the second radiator is a ground end, and a length of the second radiator between the second feed point and the ground end of the second radiator is less than or equal to half of a total length of the second radiator. In this way, the second feed point is disposed away from the first radiator. A length of the transmission line can be set to be large. In this case, a location of the feed source is more flexible.

In an implementation, a ratio of a length of the second radiator to a length of the first radiator is within a range from 1.6 to 2.4. It may be understood that, the ratio of the length of the second radiator to the length of the first radiator is set within the range from 1.6 to 2.4, to help both the first radiator and the second radiator excite a resonance mode under the radio frequency signal in the same frequency band.

In an implementation, the antenna apparatus further includes a first matching circuit and a second matching circuit. The first matching circuit is electrically connected between the transmission line and the first feed point. The second matching circuit is electrically connected between the transmission line and the second feed point.

In an implementation, the antenna apparatus further includes a third radiator. The third radiator is located on a side that is of the first radiator and that is away from the second radiator, a second gap is formed between the third radiator and the second end part of the first radiator, and the third radiator is coupled to the first radiator for feeding.

It may be understood that the composite antenna in this solution can further increase a resonance mode. This helps implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

In an implementation, the antenna apparatus further includes a third radiator. The third radiator is located on a side that is of the first radiator and that is away from the second radiator. The third radiator includes a first end part and a second end part. The first end part of the third radiator is disposed close the second end part of the first radiator, the second end part of the third radiator is disposed away from the first radiator, and a second gap is formed between the first end part of the third radiator and the second end part of the first radiator. A width d2 of the second gap satisfies: $0<d2\leq 10$ millimeters.

The second end part of the first radiator is an open end, and the first end part of the third radiator is a ground end.

The third radiator includes a third feed point, the third feed point is electrically connected to the transmission line, and the transmission line is further configured to input the radio frequency signal to the third feed point.

It may be understood that, when the width d2 of the second gap satisfies $0<d2\leq 10$ millimeters, the third radiator is disposed close to the first radiator. In this case, the third radiator and the first radiator of the antenna apparatus are disposed more compactly, to reduce space occupied by the composite antenna to a large extent.

In addition, the first end part of the third radiator is disposed as the ground end, and the ground end of the third radiator is disposed close to the open end (the second end part) of the first radiator, to effectively implement that the antenna apparatus still has high isolation in a compact design, so as to ensure that the antenna apparatus has better antenna performance.

In addition, compared with the conventional technology in which one resonance mode is excited by an IFA, a quantity of resonance modes excited by the antenna apparatus in this solution is larger. In this case, the composite antenna can implement wide frequency band coverage. In addition, when the antenna apparatus in this solution is in a free space environment, a beside head and hand left environment, or a beside head and hand right environment, the antenna apparatus has high system efficiency and a large frequency band bandwidth. In addition, there is a small difference between the system efficiency of the antenna apparatus in the beside head and hand left environment and the system efficiency of the antenna apparatus in the beside head and hand right environment. Therefore, the composite antenna in this solution can better meet requirements of electronic device communications systems.

In an implementation, the feed source includes a positive electrode and a negative electrode, the positive electrode of the feed source is electrically connected to the transmission line, and the negative electrode of the feed source is grounded. It may be understood that a feeding structure of the antenna apparatus in this solution is simple.

In an implementation, the transmission line includes a first part and a second part that are spaced. One end of the first part is electrically connected to the first feed point, and the other end of the first part is grounded. One end of the second part is electrically connected to the second feed point, and the other end of the second part is grounded. The feed source includes a positive electrode and a negative electrode, the positive electrode of the feed source is electrically connected to the first part, and the negative electrode of the feed source is electrically connected to the second part.

In an implementation, the composite antenna further includes a phase shifter. The phase shifter is disposed between the transmission line and the first feed point, or is disposed between the transmission line and the second feed point. The phase shifter may be configured to change a phase difference between the first radiator and the second radiator, so as to improve damaged isolation after a mobile phone is held.

According to a second aspect, this application provides an electronic device. The electronic device includes the antenna apparatus described above.

It may be understood that, when the antenna apparatus is applied to the electronic device, the antenna apparatus occupies a small area in the electronic device, which facilitates a miniaturization design. In addition, the antenna apparatus of the electronic device can excite a plurality of resonance modes to obtain a wide frequency band range. Moreover, the antenna apparatus in the electronic device in this solution can better meet requirements of electronic device communications systems.

In an implementation, the electronic device includes a frame. The frame includes a first short edge, and a first long edge and a second long edge that are disposed opposite to each other, the first short edge is connected between the first long edge and the second long edge, a part of the first long edge forms the first radiator, a part of the first long edge and the first short edge form the second radiator, and the transmission line is disposed close to the first long edge relative to the second long edge.

It may be understood that, when the part of the first long edge forms the first radiator, and the part of the first long edge and the first short edge form the second radiator, the first radiator and the second radiator can be disposed close to each other to a large extent, that is, the first radiator and the second radiator are disposed compactly. In addition, the first radiator and the second radiator occupy a small area, which facilitates a miniaturization design of the antenna apparatus.

Moreover, the transmission line is disposed close to the first radiator and the second radiator. In this case, the composite antenna is compact and occupies a small area.

In an implementation, the electronic device includes a frame. The frame includes a first short edge, and a first long edge and a second long edge that are disposed opposite to each other, the first short edge is connected between the first long edge and the second long edge, a part of the first long edge and the first short edge form the first radiator, a part of the first long edge forms the second radiator, and the transmission line is disposed close to the first long edge relative to the second long edge.

It may be understood that, when the part of the first long edge and the first short edge form the first radiator, and the part of the first long edge forms the second radiator, the first radiator and the second radiator can be disposed close to each other to a large extent, that is, the first radiator and the second radiator are disposed compactly. In addition, the first radiator and the second radiator occupy a small area, which facilitates a miniaturization design of the antenna apparatus.

Moreover, the transmission line is disposed close to the first radiator and the second radiator. In this case, the composite antenna is compact and occupies a small area.

DESCRIPTION OF EMBODIMENTS

Figure 1:
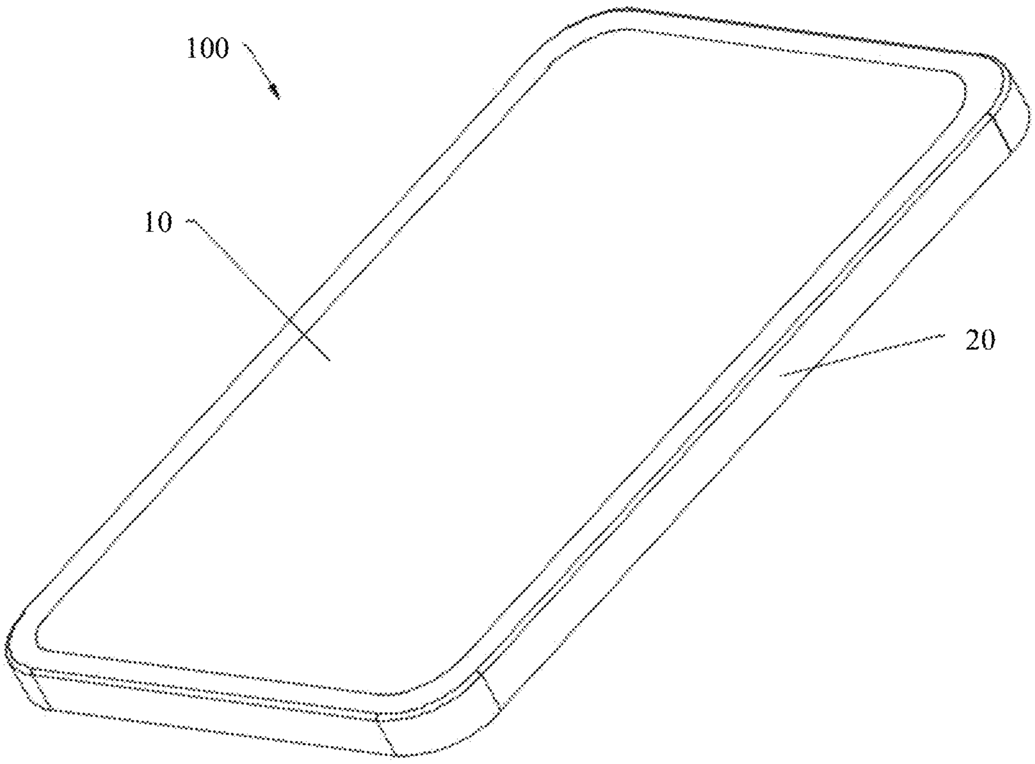
FIG. 1 is a schematic diagram of a structure of an implementation of an electronic device according to an embodiment of this application.

FIG. 1 is a schematic diagram of a structure of an implementation of an electronic device according to an embodiment of this application. The electronic device 100 may be a mobile phone, a watch, a tablet personal computer (tablet personal computer), a laptop computer (laptop computer), a personal digital assistant (personal digital assistant, PDA), a camera, a personal computer, a notebook computer, an in-vehicle device, a wearable device, augmented reality (augmented reality, AR) glasses, an AR helmet, virtual reality (virtual reality, VR) glasses, a VR helmet, or a device in another form that can receive and radiate an electromagnetic wave signal. In the embodiment shown in FIG. 1, descriptions are provided by using an example in which the electronic device 100 is a mobile phone.

Figure 2:
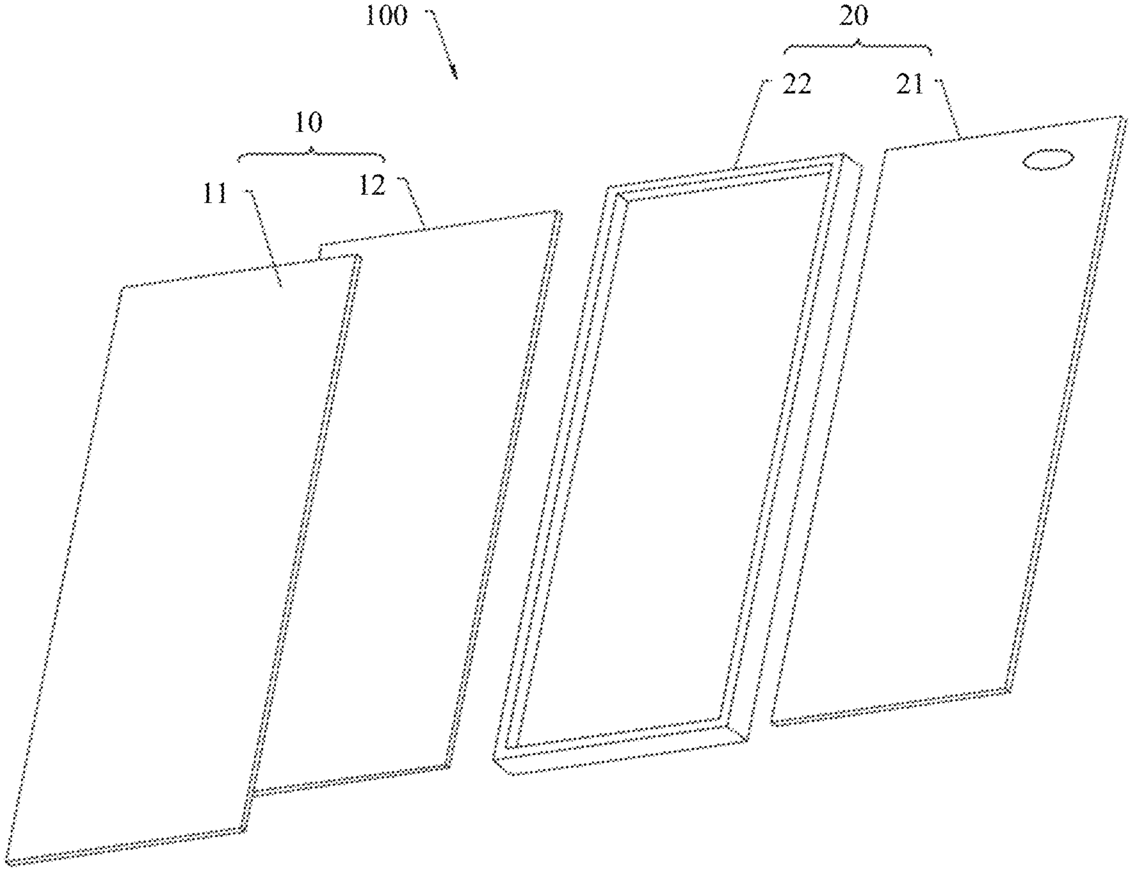
FIG. 2 is a partial schematic exploded view of the electronic device shown in FIG. 1.

With reference to FIG. 1, FIG. 2 is a partial schematic exploded view of the electronic device shown in FIG. 1. The electronic device 100 includes a screen 10 and a housing 20. It may be understood that, FIG. 1 and FIG. 2 merely show examples of some components included in the electronic device 100. Actual shapes, actual sizes, and actual structures of these components are not limited by FIG. 1 and FIG. 2. In another embodiment, when the electronic device is a device of another form, the electronic device may alternatively not include the screen 10.

The screen 10 is mounted in the housing 20. FIG. 1 shows a structure in which the screen 10 and the housing 20 substantially form a cuboid. The screen 10 may be configured to display an image, a text, and the like.

In this implementation, the screen 10 includes a protection cover plate 11 and a display 12. The protection cover plate 11 is stacked on the display 12. The protection cover plate 11 may be disposed close to the display 12, and may be mainly configured to protect the display 12 and provide a dustproof function. A material of the protection cover plate 11 may be but is not limited to glass. The display 12 may be an organic light-emitting diode (organic light-emitting diode, OLED) display.

The housing 20 may be configured to support the screen 10 and a related component in the electronic device 100. The housing 20 includes a back cover 21 and a frame 22. The back cover 21 is disposed opposite to the screen 10. The back cover 21 and the screen 10 are installed on two sides opposite to each other of the frame 22. In this case, the back cover 21, the frame 22, and the screen 10 jointly enclose an interior of the electronic device 100. An electronic component of the electronic device 100, for example, a battery, a loudspeaker, a microphone, or an earpiece, may be placed in the interior of the electronic device 100.

In an implementation, the back cover 21 may be fixedly connected to the frame 22 by using adhesive. In another implementation, the back cover 21 and the frame 22 are an integrally-formed structure, that is, the back cover 21 and the frame 22 are formed a whole.

Figure 3:
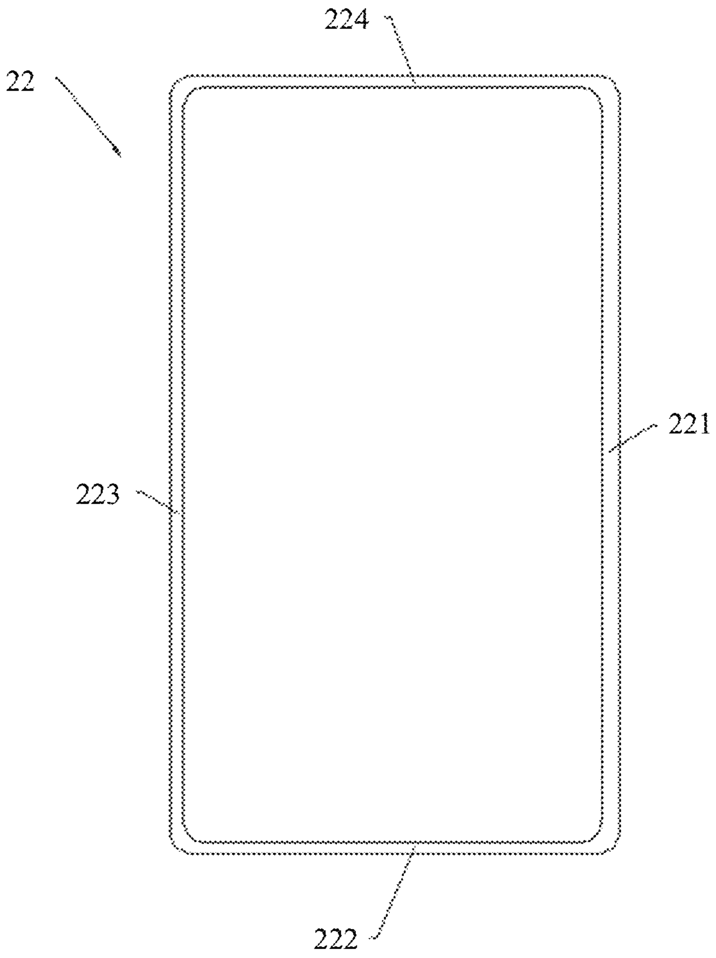
FIG. 3 is a schematic diagram of a structure of a frame of the electronic device shown in FIG. 1.

With reference to FIG. 2, FIG. 3 is a schematic diagram of a structure of a frame of the electronic device shown in FIG. 1. The frame 22 includes a first long edge 221 and a second long edge 223 that are disposed opposite to each other, and a first short edge 222 and a second short edge 224 that are disposed opposite to each other. The first short edge 222 and the second short edge 224 are connected between the first long edge 221 and the second long edge 223. In this implementation, when the electronic device 100 is used normally (the screen 10 faces the user), the first long edge 221 is a right part of the electronic device 100, the second long edge 223 is a left part of the electronic device 100, the first short edge 222 is located at a bottom of the electronic device 100, and the second short edge 224 is a top of the electronic device 100. In another implementation, locations of the first long edge 221 and the second long edge 223 may be exchanged. Locations of the first short edge 222 and the fourth short edge 224 may also be exchanged.

In addition, the electronic device 100 further includes an antenna. The electronic device 100 may communicate with a network or another device through the antenna by using one or more of the following communication technologies. The communication technology includes a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, a SUB-6G communication technology, another future communication technology, and the like.

Figure 4A:
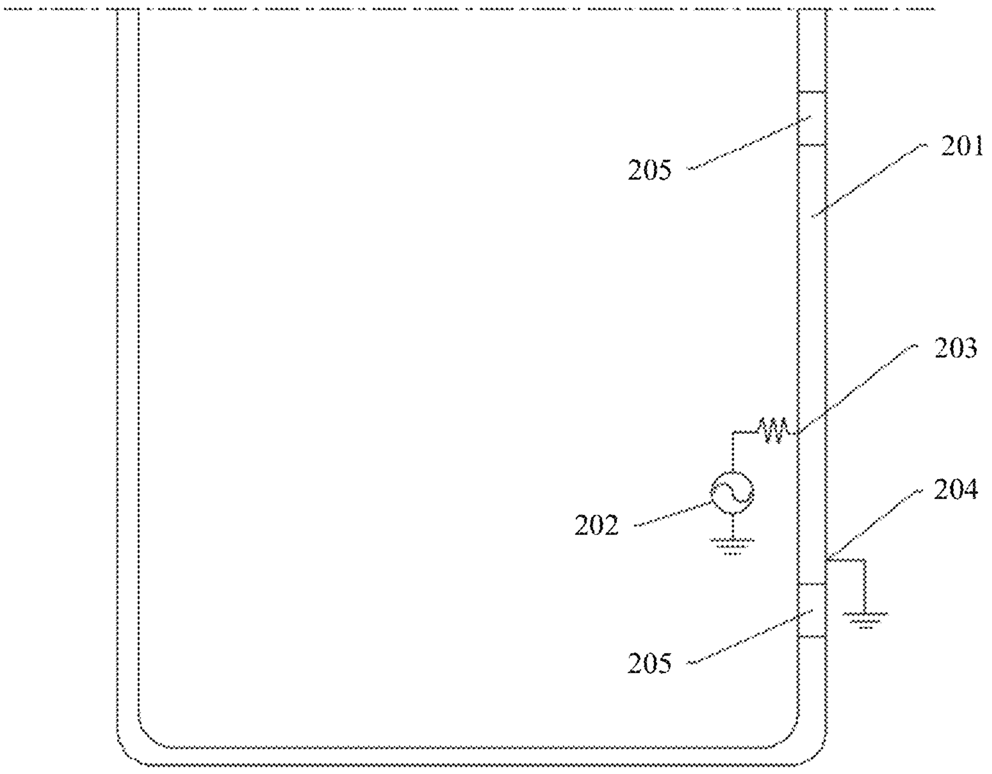
FIG. 4A is a schematic diagram of a structure of a conventional antenna of an electronic device.

It may be understood that, to bring more comfortable visual experience to users, a bezel-less screen industrial design (industrial design, ID) is used in conventional electronic devices. A bezel-less screen means a high screen-to-body ratio (usually over 90%). A bezel-less screen brings a greatly-reduced frame width, and internal components (such as a front-facing camera, a receiver, and a fingerprint sensor) of the electronic device need to be re-arranged. In an antenna design, antenna space is further reduced. To ensure that an antenna can normally receive and send an electromagnetic wave signal, an antenna design solution shown in FIG. 4A is usually used in a conventional electronic device. FIG. 4A is a schematic diagram of a structure of a conventional antenna of an electronic device.

Refer to FIG. 4A. The conventional electronic device includes an inverted-F antenna (inverted-F antenna, IFA). The IFA includes a radiator 201 and a feed source 202. The radiator 201 is a part of a frame of the conventional electronic device. A material of the frame of the conventional electronic device is a metal material. Specifically, an independent metal segment is isolated on the frame of the conventional electronic device, and the metal segment forms the radiator 201. Two ends of the radiator 201 are connected to other parts of the frame by using insulation segments 205.

In addition, the radiator 201 includes a feed point 203 and a ground point 204. The feed point 203 is electrically connected to a positive electrode of the feed source 202. As shown in FIG. 4A, the feed point 203 is electrically connected to the positive electrode of the feed source 202 by using an inductor. A negative electrode of the feed source 202 is grounded. In addition, the ground point 204 is grounded.

Figure 4B:
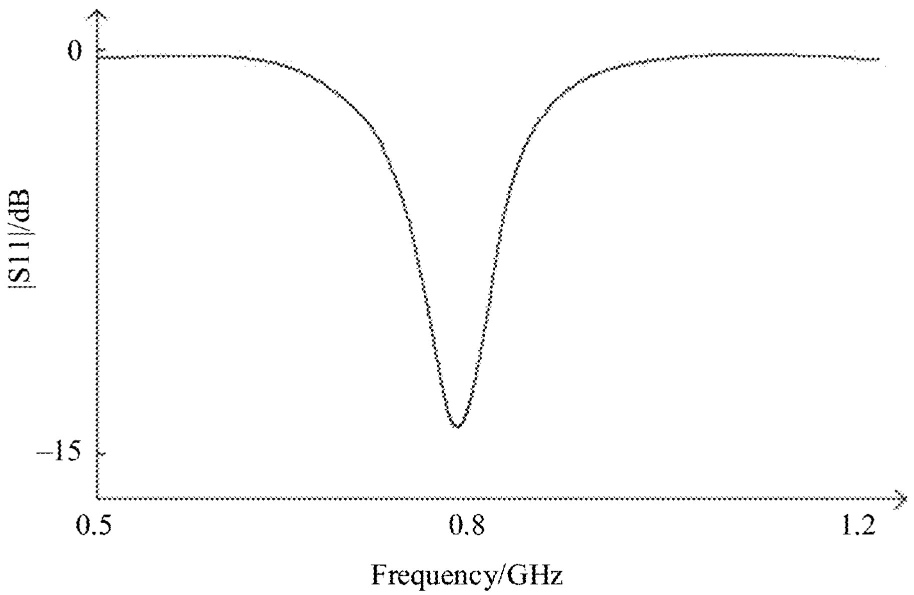
FIG. 4B is a schematic graph of an S11 curve of an IFA shown in FIG. 4A in a free space environment, a beside head and hand left environment, and a beside head and hand right environment.

FIG. 4B is a schematic graph of an S11 curve of the IFA shown in FIG. 4A in free space. It can be seen that, in free space, the IFA can excite a resonance mode. The resonance mode is near 0.81 GHz. It may be understood that, the conventional electronic device has a small quantity of resonance modes excited by the IFA, and it is difficult to implement wideband coverage.

Figure 4C:
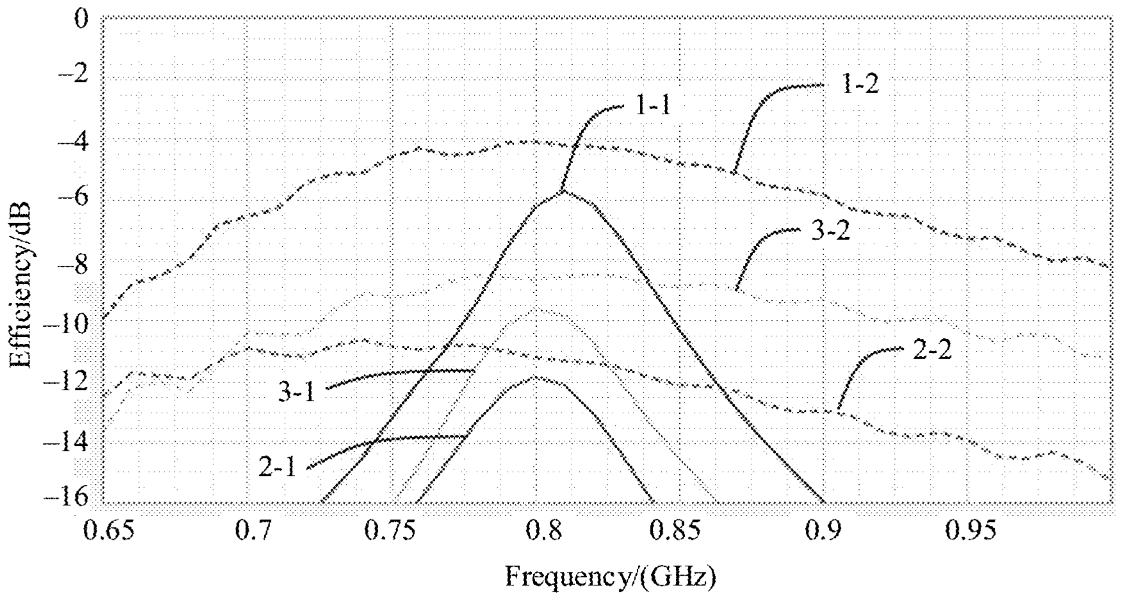
FIG. 4C is an efficiency curve of an IFA shown in FIG. 4A in a free space environment, a beside head and hand left environment, and a beside head and hand right environment.

FIG. 4C is an efficiency curve of the IFA shown in FIG. 4A in a free space environment, a beside head and hand left environment, and a beside head and hand right environment. A solid line 1-1 indicates system efficiency of the IFA in the free space environment. A solid line 2-1 indicates system efficiency of the IFA in the beside head and hand left environment. A solid line 3-1 indicates system efficiency of the IFA in the beside head and hand right environment. A dashed line 1-2 indicates radiation efficiency of the IFA in the free space environment. A dashed line 2-2 indicates radiation efficiency of the IFA in the beside head and hand left environment. A dashed line 3-2 indicates radiation efficiency of the IFA in the beside head and hand right environment. It can be seen that, in the free space environment, when the system efficiency of the IFA is −9 dB, a corresponding frequency band bandwidth of the IFA is 70 MHz. In the beside head and hand left environment, system efficiency of the IFA is −15 dB, and a corresponding frequency band bandwidth of the IFA is 70 MHz. In the beside head and hand right environment, system efficiency of the IFA is −13 dB, and a corresponding frequency band bandwidth of the IFA is 70 MHz. It is clear that, in the free space environment, the beside head and hand left environment, and the beside head and hand right environment, the system efficiency of the IFA is low, and the frequency band bandwidth of the IFA is small. In addition, there is a significant difference between the system efficiency of the IFA in the beside head and hand left environment and the system efficiency of the IFA in the beside head and hand right environment. Therefore, the IFA is far from meeting requirements of electronic device communications systems.

In this application, a compact composite antenna is disposed, and distributed feeding is performed, so that in an environment in which antenna arrangement is tight, the composite antenna occupies small space, and the composite antenna generates a plurality of resonance modes, to implement wide frequency band coverage. In addition, in the free space environment, the beside head and hand left environment, or the beside head and hand right environment, the composite antenna has high system efficiency and a large frequency band bandwidth. Moreover, there is a small difference between the efficiency of the composite antenna in the beside head and hand left environment and the efficiency of the composite antenna in the beside head and hand right environment, and antenna performance is better. Therefore, the composite antenna in this application can better meet requirements of electronic device communications systems. It may be understood that distributed feeding refers to a manner in which one feed source feeds a plurality of radiators.

In this embodiment, the compact composite antenna may be disposed in a plurality of manners. The following describes several manners of disposing the compact composite antenna in detail with reference to related accompanying drawings.

Figure 5A:
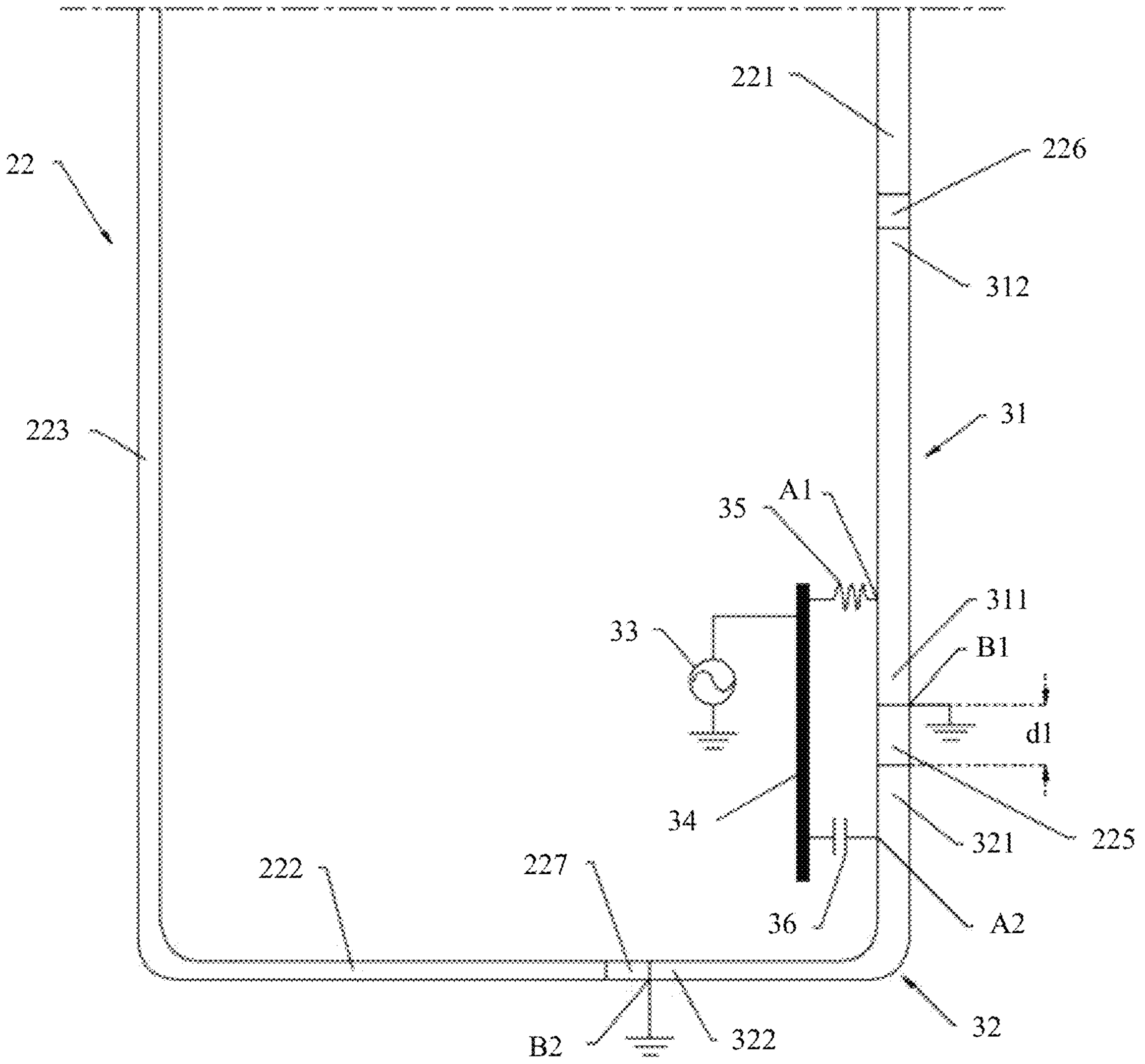
FIG. 5A is a schematic diagram of a structure of an implementation of a composite antenna of the electronic device shown in FIG. 1.

In a first implementation: FIG. 5A is a schematic diagram of a structure of an implementation of a composite antenna of the electronic device shown in FIG. 1. The composite antenna includes a first radiator 31 and a second radiator 32. The first radiator 31 uses a radiator structure of an IFA. The second radiator 32 uses a radiator structure of a composite right/left-handed (composite right/left-handed, CRLH) antenna. Both the first radiator 31 and the second radiator 32 use a structure form of the frame 22. Specifically, a material of the frame 22 is a metal material. A first gap 225 and a second gap 226 are made on the first long edge 221. A third gap 227 is made on the first short edge 222. A metal segment is isolated on the first long edge 221 by the first gap 225 and the second gap 226, to form the first radiator 31. A metal segment is isolated on the first long edge 221 and the first short edge 222 by the first gap 225 and the third gap 227, to form the second radiator 32. In this way, two ends of the second radiator 32 and the first radiator 31 that are close to each other form the first gap 225. It may be understood that the first gap 225, the second gap 226, and the third gap 227 may be filled with an insulation material. For example, the insulation material may be a material such as a polymer, glass, or ceramic, or a combination of these materials.

In another implementation, the first radiator 31 and the second radiator 32 are not limited to the structure form of the frame 22 shown in FIG. 5A, and may also use another structure manner. For example, a material of the frame 22 is an insulation material. In this case, two adjacent flexible circuit boards are fastened on an inner side surface of the frame 22, or two adjacent conductive segments are formed on an inner side surface of the frame 22 (for example, a material of the conductive segment may be but is not limited to copper, gold, silver, or graphene). The flexible circuit boards or the conductive segments are used to form the first radiator 31 and the second radiator 32. For another example, the first radiator 31 and the second radiator 32 may alternatively be formed by two adjacent conductive segments formed on the back cover 21 (refer to FIG. 2), or the first radiator 31 and the second radiator 32 may alternatively be formed by two adjacent conductive segments formed on an antenna mount inside the electronic device 100.

Refer to FIG. 5A again. A width d1 of the first gap 225 (that is, a distance between the two ends of the first radiator 31 and the second radiator 32 that are close to each other) satisfies: $0<d1\leq 10$ millimeters. For example, d1 is equal to 0.25 mm, 0.5 mm, 0.61 mm, 0.8 mm, 1.2 mm, 2.3 mm, 3.8 mm, 4.2 mm, 5.3 mm, 6.6 mm, 7 mm, 8 mm, 9 mm, or 10 mm. In this way, the second radiator 32 can be disposed close to the first radiator 31 to a greater extent, that is, the first radiator 31 and the second radiator 32 are disposed compactly, to reduce space occupied by the first radiator 31 and the second radiator 32.

In another implementation, the width d1 of the first gap 225 may not fall within the range. However, a width of the first gap 225 between the first radiator 31 and the second radiator 32 is small. In this case, the second radiator 32 can also be disposed close to the first radiator 31, that is, the first radiator 31 and the second radiator 32 are disposed compactly, to reduce space occupied by the first radiator 31 and the second radiator 32.

In an implementation, the width d1 of the first gap 225 satisfies: $0<d1\leq 2.5$ millimeters. In this case, the second radiator 32 is disposed close to the first radiator 31 to a greater extent, and the composite antenna is more compact, to reduce space occupied by the composite antenna to a greater extent.

Refer to FIG. 5A again. The first radiator 31 includes a first end part 311 and a second end part 312 disposed away from the first end part 311. In addition, the first end part 311 of the first radiator 31 is disposed close to the second radiator 32. The second end part 312 of the first radiator 31 is an open end, that is, the second end part 312 of the first radiator 31 is not grounded.

In addition, the first radiator 31 includes a first feed point A1 and a first ground point B1. The first ground point B1 is located on the first end part 311 of the first radiator 31, that is, the first end part 311 of the first radiator 31 is a ground end. The first feed point A1 is located on a side that is of the first ground point B1 and that is away from the second radiator 32. A length of the first radiator 31 between the first feed point A1 and the first ground point B1 is less than or equal to half of a total length of the first radiator 31, that is, a length of the first radiator 31 between the first feed point A1 and the ground end of the first radiator 31 is less than or equal to half of the total length of the first radiator 31. In this case, the first feed point A1 is disposed close to the first ground point B1. It may be understood that the total length of the first radiator 31 in this implementation is a length from the first ground point B1 to an end face of the second end part 312 of the first radiator 31 along an extension direction of the first long edge 221.

In addition, the second radiator 32 includes a first end part 321 and a second end part 322 disposed away from the first end part 321. The first end part 321 of the second radiator 32 is disposed close to the first radiator 31. The first end part 321 of the second radiator 32 is an open end. In addition, the second radiator 32 includes a second feed point A2 and a second ground point B2. The second ground point B2 is located on the second end part 322 of the second radiator 32, that is, the second end part 322 of the second radiator 32 is a ground end. The second feed point A2 is located on a side that is of the second ground point B2 and that is close to the first radiator 31. In addition, a length of the second radiator 32 between the second feed point A2 and the second ground point B2 is greater than half of a total length of the second radiator 32, that is, a length of the second radiator 32 between the second feed point A2 and the ground end of the second radiator 32 is greater than half of the total length of the second radiator 32. In this case, the second feed point A2 is disposed away from the second ground point B2. It may be understood that a total length of the second radiator 32 is a length from the second ground point B2 to an end face of the first end part 321 of the second radiator 32 along an extension direction of the frame 22.

It may be understood that, the first end part 311 of the first radiator 31 is disposed as the ground end, and the ground end of the first radiator 31 is disposed close to the open end (the first end part 321) of the second radiator 32, to effectively implement that the composite antenna still has high isolation in a compact design, so as to ensure that the composite antenna has better antenna performance.

Refer to FIG. 5A again. A ratio of the length of the first radiator 31 to the length of the second radiator 32 is within a range from 0.8 to 1.2. For example, the ratio of the length of the first radiator 31 to the length of the second radiator 32 is 0.8, 0.83, 0.9, 0.93, 1, 1.02, 1.1, 1.15, or 1.2. In this implementation, the ratio of the length of the first radiator 31 to the length of the second radiator 32 is equal to 1. For example, the length of the first radiator 31 is 0.25. The length of the second radiator 32 is 0.25λ. λ is a wavelength of an electromagnetic wave signal radiated and received by the composite antenna. A wavelength λ of an electromagnetic wave signal in the air may be calculated as follows: $\lambda = c/f$, where c is the speed of light. f is an operating frequency of the composite antenna. A wavelength of an electromagnetic wave signal in a medium may be calculated as follows: $\lambda = (c/\sqrt{\varepsilon})/f$, where c is a relative dielectric constant of the medium. In addition, in an actual application, the ratio of the length of the first radiator 31 to the length of the second radiator 32 is difficult to be equal to 1, and a matching circuit may be disposed in the composite antenna, and the matching circuit is adjusted to compensate for such a structural error.

It may be understood that, the ratio of the length of the first radiator 31 to the length of the second radiator 32 is set within the range from 0.8 to 1.2, to help both the first radiator 31 and the second radiator 32 excite a resonance mode under a radio frequency signal in a same frequency band.

In another implementation, the ratio of the length of the first radiator 31 to the length of the second radiator 32 may not fall within the range from 0.8 to 1.2.

Refer to FIG. 5A again. The composite antenna further includes a feed source 33, a transmission line 34, a first matching circuit 35, and a second matching circuit 36. The transmission line 34 may be a cable on a mainboard or a sub-board, a flexible circuit board, a microstrip, a cable layer on the antenna mount, or the like. Specifically, this is not limited in this implementation. In addition, the transmission line 34, the first matching circuit 35, and the second matching circuit 36 are all disposed close to the first long edge 221 relative to the second long edge 223. In this way, compared with a solution in which the transmission line 34 spans from the first long edge 221 to the second long edge 223, in this implementation, the transmission line 34 is disposed close to the first long edge 221, and the transmission line 34 occupies small space. This helps implement a miniaturization design of the composite antenna. In addition, the transmission line 34, the first matching circuit 35, and the second matching circuit 36 are all disposed close to the first radiator 31 and the second radiator 32. In this case, the composite antenna is compact and occupies a small area.

In addition, the first matching circuit 35 is electrically connected between the transmission line 34 and the first feed point A1. The second matching circuit 36 is electrically connected between the transmission line 34 and the second feed point A2. In this implementation, the first matching circuit 35 may be an inductor. The second matching circuit 36 may be a capacitor. In addition, a positive electrode of the feed source 33 is electrically connected to the transmission line 34. A negative electrode of the feed source 33 is grounded. The feed source 33 inputs a radio frequency signal in a same frequency band to the first feed point A1 and the second feed point A2 through the transmission line 34. In other words, input signals of the first radiator 31 and the second radiator 32 are radio frequency signals in a same frequency band. For example, the frequency band of the radio frequency signal is within a range from 600 megahertz to 1000 megahertz. In another implementation, the frequency band of the radio frequency signal may alternatively be in another low frequency band.

In an implementation, the composite antenna further includes a phase shifter. The phase shifter may be disposed between the transmission line 34 and the first feed point A1. For example, the phase shifter may be disposed between the transmission line 34 and the first matching circuit 35. The phase shifter may be configured to change a phase difference between the first radiator 31 and the second radiator 32, so as to improve damaged isolation after the mobile phone is held. In another implementation, the phase shifter may alternatively be disposed between the transmission line 34 and the second feed point A2. For example, the phase shifter may be disposed between the transmission line 34 and the second matching circuit 36.

The following describes simulation of the composite antenna provided in the first implementation with reference to the accompanying drawings.

Figure 5B:
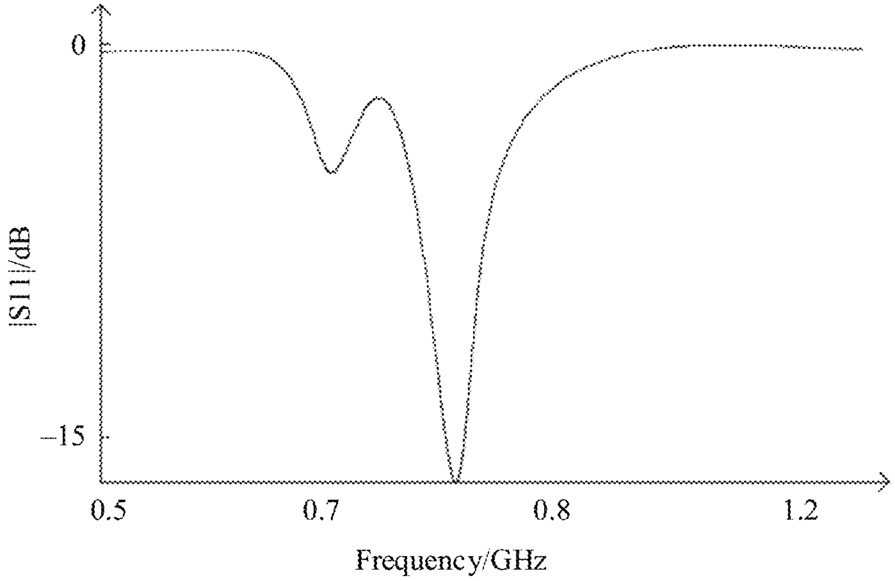
FIG. 5B is a schematic graph of an S11 curve of the composite antenna shown in FIG. 5A in free space.

FIG. 5B is a schematic graph of an S11 curve of the composite antenna shown in FIG. 5A in free space. The composite antenna may generate two resonance modes at 0.5 GHz to 1.2 GHz: a resonance “1” (0.71 GHz) and a resonance “2” (0.87 GHz). It is clear that, compared with the conventional technology in which one resonance mode is excited by the IFA, in this implementation, a quantity of resonance modes excited by the composite antenna is increased by one. In this case, the composite antenna can implement wide frequency band coverage.

Figure 5C:
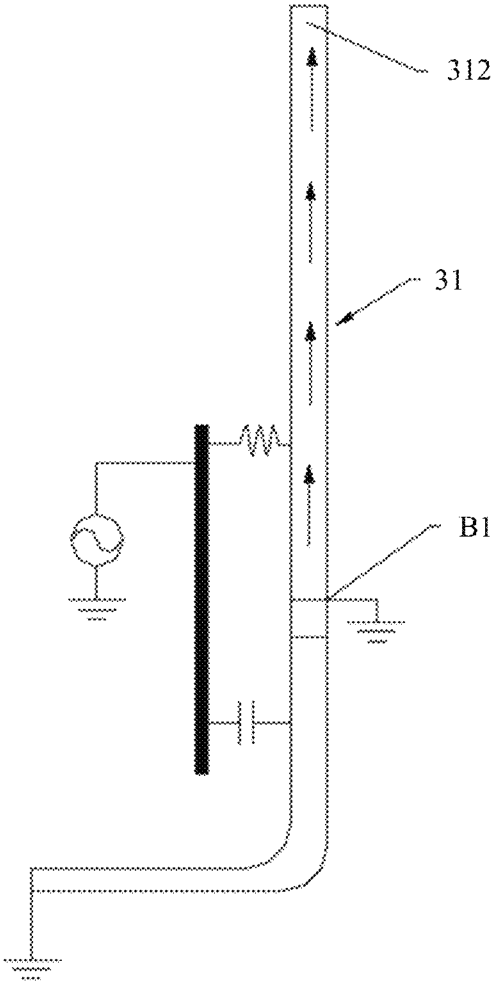
FIG. 5C is a schematic diagram of a flow direction of a current of the composite antenna shown in FIG. 5A under a resonance “1”
Figure 5D:
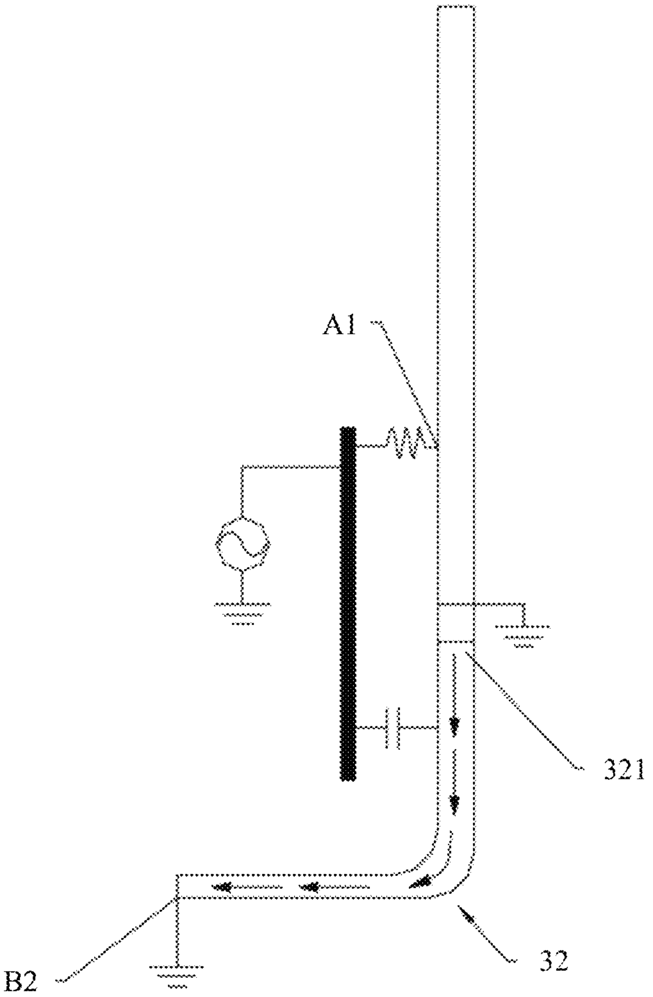
FIG. 5D is a schematic diagram of a flow direction of a current of the composite antenna shown in FIG. 5A under a resonance “2”

Refer to FIG. 5C and FIG. 5D. FIG. 5C is a schematic diagram of a flow direction of a current of the composite antenna shown in FIG. 5A under the resonance “1”. FIG. 5D is a schematic diagram of a flow direction of a current of the composite antenna shown in FIG. 5A under the resonance “2”. It can be seen from FIG. 5C that the current of the composite antenna under the resonance “1” mainly includes a current flowing from the first ground point B1 to the second end part 312 of the first radiator 31. It can be seen from FIG. 5D that the current of the composite antenna under the resonance “2” mainly includes a current flowing from the first end part 321 of the second radiator 32 to the second ground point B2.

Figure 5E:
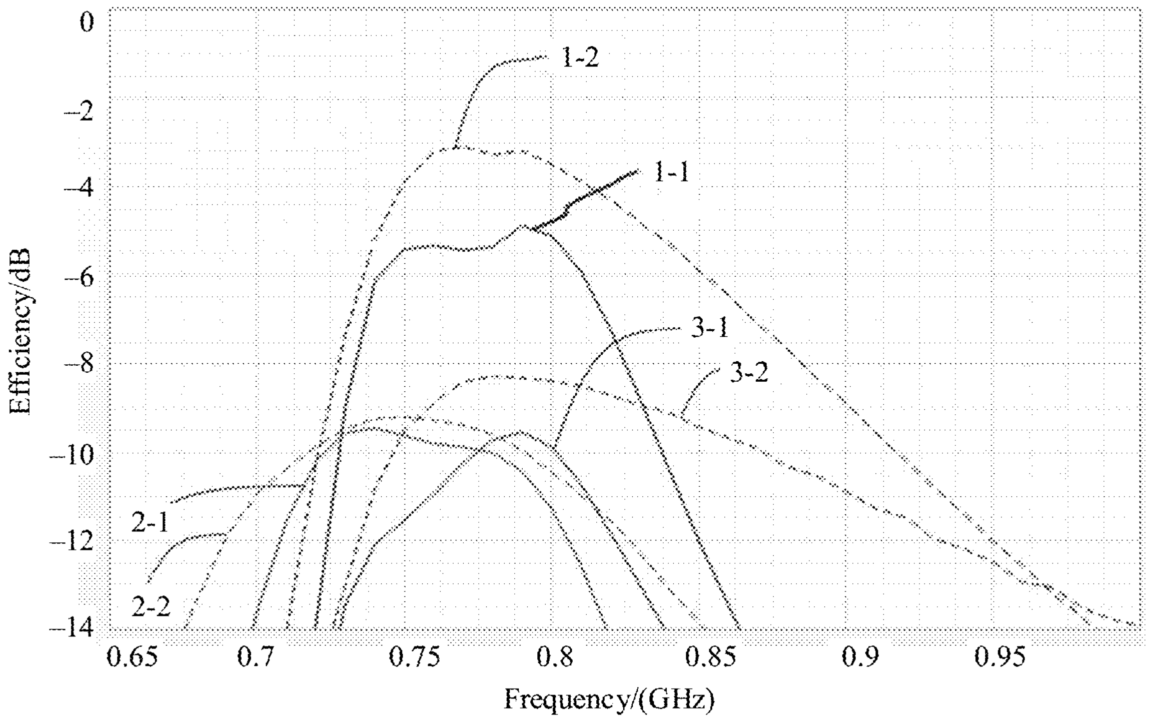
FIG. 5E is an efficiency curve of the composite antenna shown in FIG. 5A in a free space environment, a beside head and hand left environment, and a beside head and hand right environment.

FIG. 5E is an efficiency curve of the composite antenna shown in FIG. 5A in a free space environment, a beside head and hand left environment, and a beside head and hand right environment. A solid line 1-1 indicates system efficiency of the composite antenna in the free space environment. A solid line 2-1 indicates system efficiency of the composite antenna in the beside head and hand left environment. A solid line 3-1 indicates system efficiency of the composite antenna in the beside head and hand right environment. A dashed line 1-2 indicates radiation efficiency of the composite antenna in the free space environment. A dashed line 2-2 indicates radiation efficiency of the composite antenna in the beside head and hand left environment. A dashed line 3-2 indicates radiation efficiency of the composite antenna in the beside head and hand right environment.

It can be seen from FIG. 5E that, in the free space environment, when the system efficiency of the composite antenna is −7 dB, a corresponding frequency band bandwidth of the composite antenna may be greater than 80 MHz. In the beside head and hand left environment, when the system efficiency of the composite antenna is −11 dB, a corresponding frequency band bandwidth of the composite antenna may be greater than 80 MHz. In the beside head and hand right environment, when the system efficiency of the composite antenna is −12 dB, a corresponding frequency band bandwidth of the composite antenna may be greater than 80 MHz. Obviously, compared with the conventional IFA, when the composite antenna in this implementation is in the free space environment, the beside head and hand left environment, or the beside head and hand right environment, the composite antenna has high system efficiency and a large frequency band bandwidth. In addition, there is a small difference between the system efficiency of the composite antenna in the beside head and hand left environment and the system efficiency of the composite antenna in the beside head and hand right environment. Therefore, the composite antenna in this application can better meet requirements of electronic device communications systems.

Figure 5F:
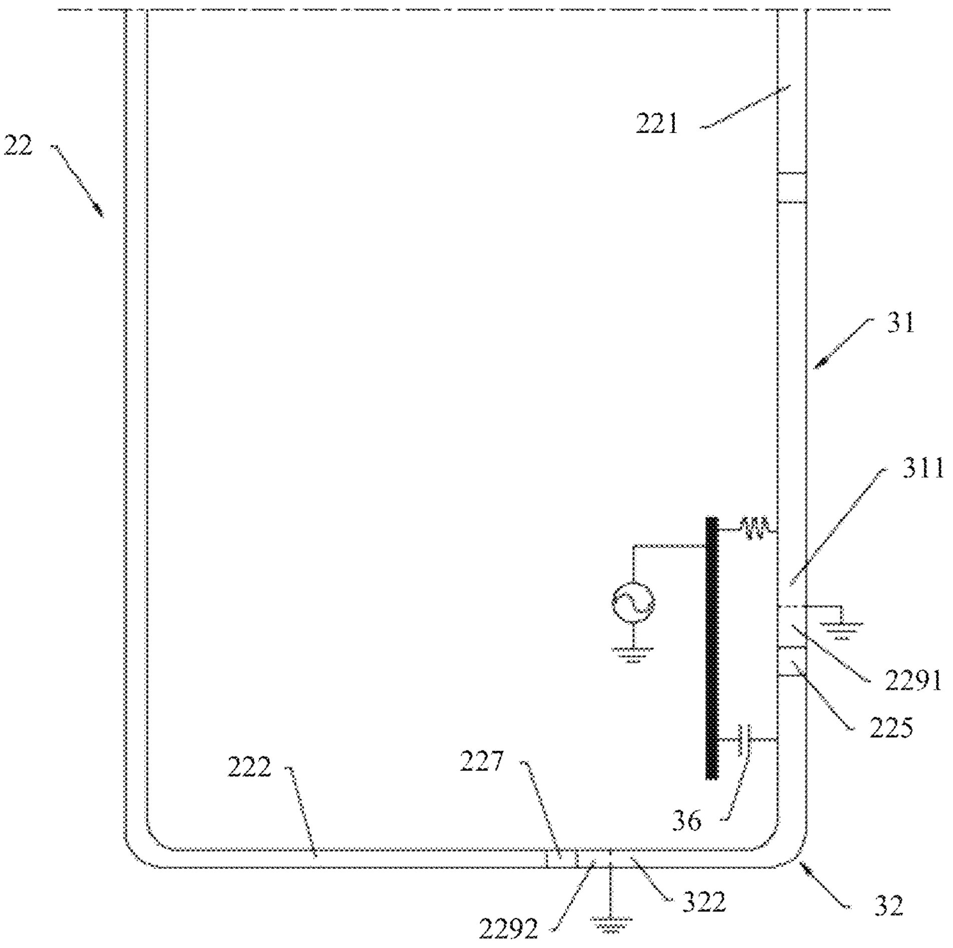
FIG. 5F is a schematic diagram of a structure of another implementation of a composite antenna of the electronic device shown in FIG. 1.

In an implementation, FIG. 5F is a schematic diagram of a structure of another implementation of a composite antenna of the electronic device shown in FIG. 1. Technical content that is the same as the foregoing first implementation is not described again. The first long edge 221 further includes a first metal segment 2291. The first metal segment 2291 is disposed in the first gap 225, and the first metal segment 2291 is connected to an end part that is of the first radiator 31 and that faces the second radiator 32, that is, is connected to the ground end of the first radiator 31. In FIG. 5F, the first radiator 31 and the first metal segment 2291 are simply distinguished by using a dashed line. It may be understood that the first metal segment 2291 can fill a part of the first gap 225, to avoid that appearance consistency of the electronic device 100 is affected because of an obvious difference between the first gap 225 and the first radiator 31 or the second radiator 32.

In addition, the first short edge 222 further includes a second metal segment 2292. The second metal segment 2292 is disposed in the third gap 227, and the second metal segment 2292 is connected to an end part that is of the second radiator 32 and that is away from the first radiator 31, that is, is connected to the ground end 322 of the second radiator 32. In FIG. 5F, the second radiator 32 and the second metal segment 2292 are simply distinguished by using a dashed line. It may be understood that the second metal segment 2292 can fill a part of the third gap 227, to avoid that appearance consistency of the electronic device 100 is affected because of an obvious difference between the third gap 227 and the second radiator 32.

Figure 6A:
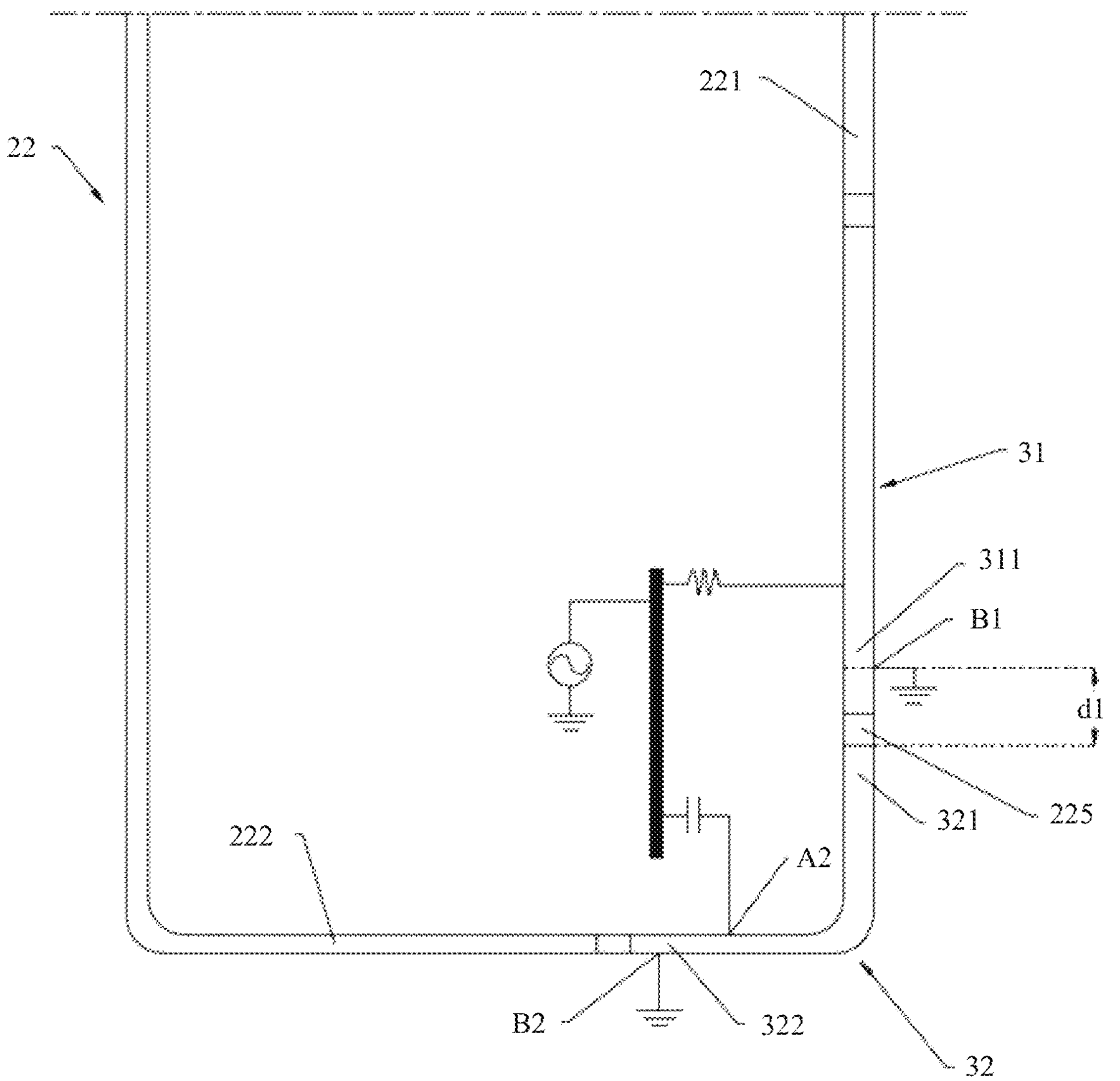
FIG. 6A is a schematic diagram of a structure of still another implementation of a composite antenna of the electronic device shown in FIG. 1.

In an extended implementation 1, FIG. 6A is a schematic diagram of a structure of still another implementation of a composite antenna of the electronic device shown in FIG. 1. Technical content that is the same as the foregoing first implementation is not described again. The composite antenna includes a first radiator 31 and a second radiator 32. The first radiator 31 uses a radiator structure of an IFA. For a structural form of the first radiator 31, refer to the structural form of the first radiator 31 in the first implementation. Details are not described herein again.

In addition, the second radiator 32 also uses a radiator structure of an IFA. This is different from the first implementation in which the second radiator 32 uses the radiator structure of the CRLH antenna. The second radiator 32 may use the structure form of the frame 22. Specifically, an independent metal segment is isolated on the first long edge 221 and the first short edge 222. The metal segment forms the second radiator 32. Two ends of the second radiator 32 and the first radiator 31 that are close to each other form a first gap 225. For a width d1 of the first gap 225, refer to the width d1 of the first gap 225 in the first implementation. Details are not described herein again.

Refer to FIG. 6A again. A first end part 321 of the second radiator 32 is disposed close to the first radiator 31. The first end part 321 of the second radiator 32 is an open end. A second ground point B2 is located on a second end part 322 of the second radiator 32, that is, the second end part 322 of the second radiator 32 is a ground end. A second feed point A2 is located on a side that is of the second ground point B2 and that is close to the first radiator 31. In addition, a length of the second radiator 32 between the second feed point A2 and the second ground point B2 is less than or equal to half of a total length of the second radiator 32, that is, a length of the second radiator 32 between the second feed point A2 and the ground end of the second radiator 32 is less than or equal to half of the total length of the second radiator 32. In this case, the second feed point A2 is disposed close to the second ground point B2.

In this implementation, for a ratio of a length of the first radiator 31 to the length of the second radiator 32, refer to the ratio of the length of the first radiator 31 to the length of the second radiator 32 in the first implementation. Details are not described herein again. In addition, for a feeding manner of the composite antenna, refer to the feeding manner of the composite antenna in the first implementation. Details are not described herein again.

It may be understood that space occupied by the composite antenna in this implementation can also be small. In addition, compared with a quantity of resonance modes excited by the conventional IFA, in this implementation, a quantity of resonance modes excited by the composite antenna can also be increased by one. In this case, the composite antenna can implement wide frequency band coverage. Moreover, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

In another implementation, the second radiator 32 may alternatively use a radiator structure of a loop antenna. Details are not described herein again.

Figure 6B:
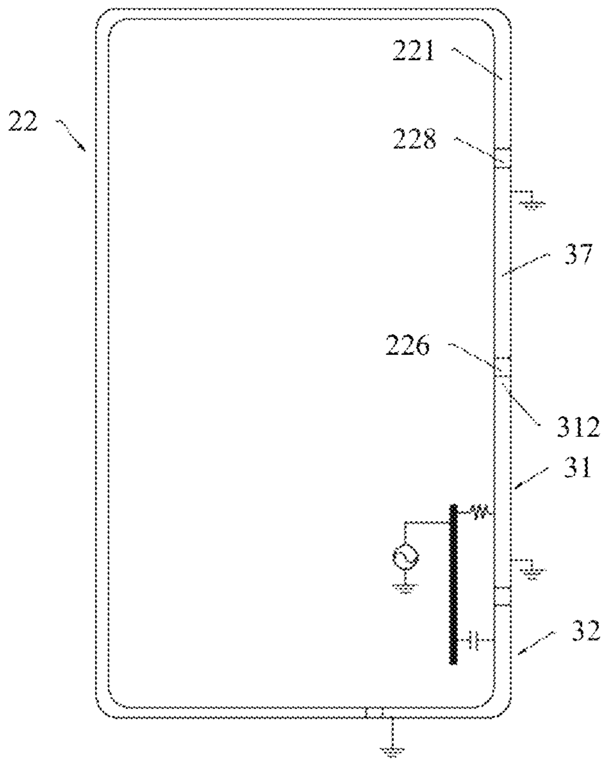
FIG. 6B is a schematic diagram of a structure of yet another implementation of a composite antenna of the electronic device shown in FIG. 1.

In an extended implementation 2, FIG. 6B is a schematic diagram of a structure of yet another implementation of a composite antenna of the electronic device shown in FIG. 1. Technical content that is the same as the foregoing first implementation and the extended implementation 1 is not described again. The composite antenna includes a first radiator 31, a second radiator 32, and a third radiator 37. For disposing manners of the first radiator 31 and the second radiator 32, refer to the disposing manners of the first radiator 31 and the second radiator 32 in the foregoing first implementation. Details are not described herein again.

The third radiator 37 may use the structure form of the frame 22. Specifically, a fourth gap 228 is made on the first long edge 221. The fourth gap 228 may be filled with an insulation material. For example, the insulation material may be a material such as a polymer, glass, or ceramic, or a combination of these materials. An independent metal segment is isolated on the first long edge 221 by the fourth gap 228 and a second gap 226. The metal segment forms the third radiator 37. In this case, the third radiator 37 is located on a side that is of the first radiator 31 and that is away from the second radiator 32. The third radiator 37 and a second end part 312 of the first radiator 31 form the second gap 226.

In addition, the third radiator 37 is coupled to the first radiator 31 for feeding. In this case, a radio frequency signal can be fed to the third radiator 37 through the first radiator 31.

It may be understood that, compared with the composite antenna in the extended implementation 1, the composite antenna in this implementation can further increase a resonance mode. This helps implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

Figure 6C:
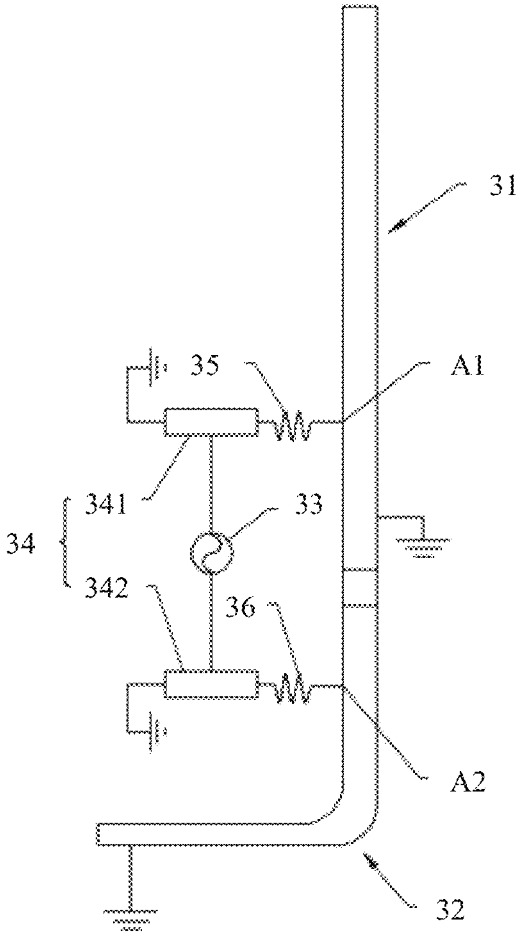
FIG. 6C is a schematic diagram of a structure of yet still another implementation of a composite antenna of the electronic device shown in FIG. 1.

In an extended implementation 3, FIG. 6C is a schematic diagram of a structure of yet still another implementation of a composite antenna of the electronic device shown in FIG. 1. Technical content that is the same as the foregoing first implementation, the extended implementation 1, and the extended implementation 2 is not described again. The composite antenna includes a first radiator 31 and a second radiator 32. For disposing manners of the first radiator 31 and the second radiator 32, refer to the disposing manners of the first radiator 31 and the second radiator 32 in the foregoing first implementation or the disposing manners of the first radiator 31 and the second radiator 32 in the extended implementation 1. Details are not described herein again.

In addition, the composite antenna further includes a feed source 33, a transmission line 34, a first matching circuit 35, and a second matching circuit 36. The transmission line 34 includes a first part 341 and a second part 342 that are spaced. One end of the first part 341 is electrically connected to a first feed point A1 through the first matching circuit 35. The other end of the first part 341 is grounded. One end of the second part 342 is electrically connected to a second feed point A2 through the second matching circuit 36. The other end of the second part 342 is grounded. In this implementation, the first matching circuit 35 and the second matching circuit 36 are both inductors. In another implementation, the first matching circuit 35 may alternatively be a capacitor. The second matching circuit 36 may alternatively be a capacitor.

In addition, a positive electrode of the feed source 33 is electrically connected to the first part 341. A negative electrode of the feed source 33 is electrically connected to the second part 342. In another implementation, the positive electrode of the feed source 33 may alternatively be electrically connected to the second part 342. The negative electrode of the feed source 33 may alternatively be electrically connected to the first part 341.

It may be understood that, compared with a quantity of resonance modes excited by the conventional IFA, in this implementation, a quantity of resonance modes excited by the composite antenna can also be increased. In this case, the composite antenna can implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this implementation can better meet requirements of electronic device communications systems.

In another extended implementation, the composite antenna in the extended implementation 3 may alternatively include the third radiator of the composite antenna in the extended implementation 2. For details, refer to the disposing manner of the third radiator in the extended implementation 2. The details are not described herein again.

Figure 6D:
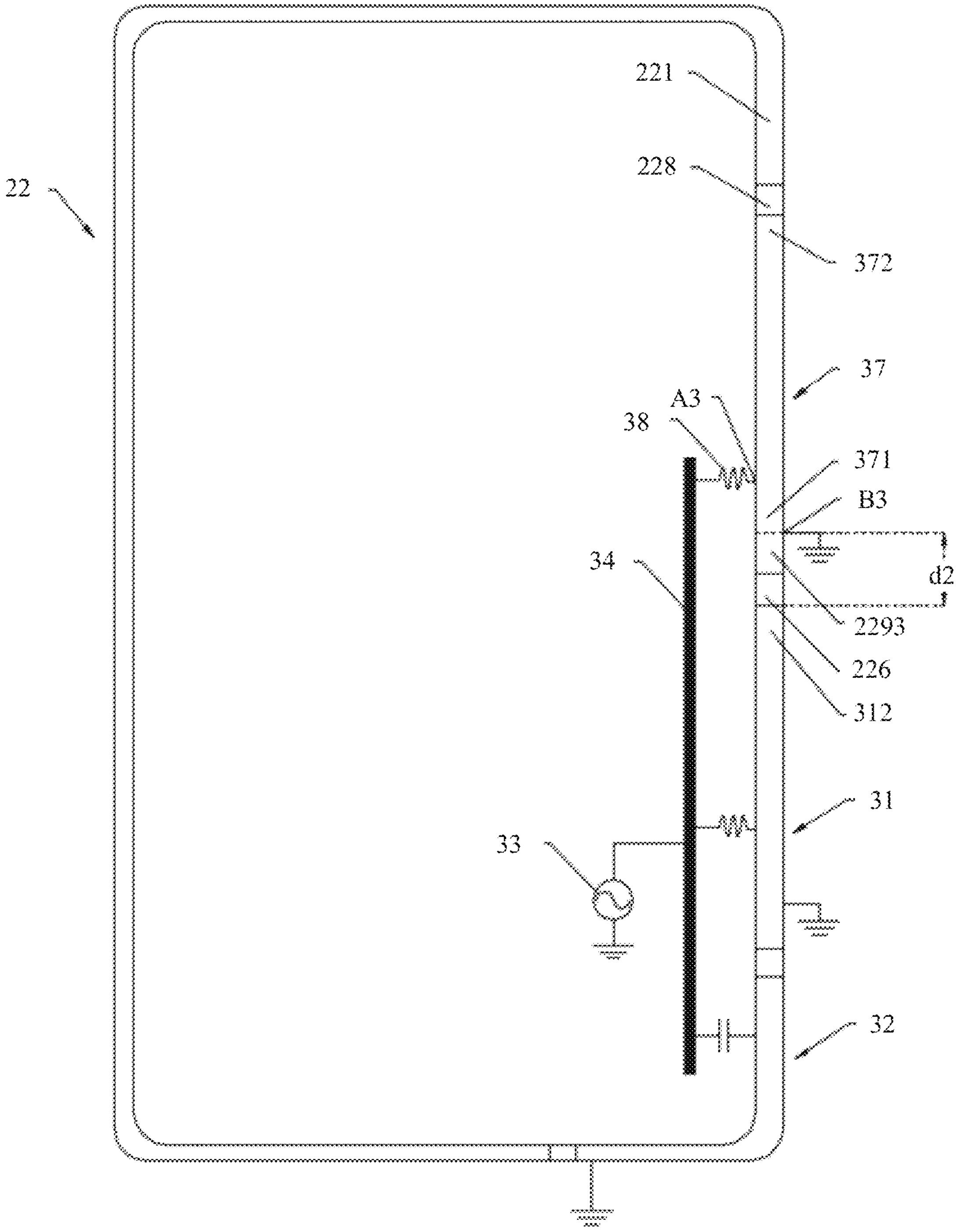
FIG. 6D is a schematic diagram of a structure of another implementation of a composite antenna of the electronic device shown in FIG. 1.

In an extended implementation 4, FIG. 6D is a schematic diagram of a structure of another implementation of a composite antenna of the electronic device shown in FIG. 1. Technical content that is the same as the foregoing first implementation, the extended implementation 1, and the extended implementation 3 is not described again. The composite antenna includes a first radiator 31, a second radiator 32, and a third radiator 37. For disposing manners of the first radiator 31 and the second radiator 32, refer to the disposing manners of the first radiator 31 and the second radiator 32 in the foregoing first implementation. Details are not described herein again. In addition, the third radiator 37 may use the structure form of the frame 22. Specifically, a fourth gap 228 is made on the first long edge 221. The fourth gap 228 may be filled with an insulation material. For example, the insulation material may be a material such as a polymer, glass, or ceramic, or a combination of these materials. An independent metal segment is isolated on the first long edge 221 by the fourth gap 228 and a second gap 226. The metal segment forms the third radiator 37. In this way, two ends of the third radiator 37 and the first radiator 31 that are close to each other form a second gap 226.

In addition, a width d2 of the second gap 226 (that is, a distance between the two ends of the third radiator 37 and the first radiator 31 that are close to each other) satisfies: 0<d2≤10 millimeters. For example, d2 is equal to 0.25 mm, 0.5 mm, 0.61 mm, 0.8 mm, 1.2 mm, 2.3 mm, 3.8 mm, 4.2 mm, 5.3 mm, 6.6 mm, 7 mm, 8 mm, 9 mm, or 10 mm. In this way, the third radiator 37 can be disposed close to the first radiator 31 to a greater extent, that is, the first radiator 31 and the third radiator 37 are disposed compactly, to implement compact disposition of the composite antenna. This effectively reduces space occupied by the composite antenna.

In an implementation, the width d2 of the second gap 226 satisfies: 0<d2≤2.5 millimeters. In this case, the third radiator 37 is further disposed close to the first radiator 31, to implement a more compact design of the composite antenna, so as to reduce space occupied by the composite antenna to a large extent.

In another implementation, the third radiator 37 is not limited to the structure form of the frame 22 shown in FIG. 6D, and may also use another structure manner. For example, a material of the frame 22 is an insulation material. In this case, a flexible circuit board is fastened on an inner side surface of the frame 22, or a conductive segment is formed on an inner side surface of the frame 22 (for example, a material of the conductive segment may be but is not limited to copper, gold, silver, or graphene). The flexible circuit board or the conductive segment is used to form the third radiator 37. For another example, the third radiator 37 may also be formed by a conductive segment formed on the back cover 21 (refer to FIG. 2), or the third radiator 37 may alternatively be formed by a conductive segment formed on the antenna mount inside the electronic device 100.

Refer to FIG. 6D again. The frame 22 further includes a third metal segment 2293. The third metal segment 2293 is disposed in the second gap 226, and the third metal segment 2293 is connected to an end part that is of the third radiator 37 and that faces the first radiator 31. In FIG. 6D, the third radiator 37 and the third metal segment 2293 are simply distinguished by using a dashed line. It may be understood that the third metal segment 2293 can fill a part of the second gap 226, to avoid that appearance consistency of the electronic device 100 is affected because of an obvious difference between the second gap 226 and the first radiator 31 or the third radiator 37. In another implementation, the frame 22 may not include the third metal segment 2293.

In addition, the third radiator 37 includes a first end part 371 and a second end part 372 disposed away from the first end part 371. The first end part 371 of the third radiator 37 and a second end part 312 of the first radiator 31 form the second gap 226. In addition, the first end part 371 of the third radiator 37 is disposed close to the first radiator 31, and the first end part 371 of the third radiator 37 is connected to the third metal segment 2293. The second end part 372 of the third radiator 37 is an open end, that is, the second end part 372 of the third radiator 37 is not grounded. In addition, the third radiator 37 includes a third feed point A3 and a third ground point B3. The third ground point B3 is located on the first end part 371 of the third radiator 37, that is, the first end part 371 of the third radiator 37 is a ground end. The third feed point A3 is located on a side that is of the third ground point B3 and that is away from the first radiator 31. A length of the third radiator 37 between the third feed point A3 and the third ground point B3 is less than or equal to half of a total length of the third radiator 37. In this case, the third feed point A3 is disposed close to the third ground point B3. It may be understood that the total length of the third radiator 37 is a length from the third ground point B3 to an end face of the second end part 372 of the third radiator 37 along the extension direction of the first long edge 221.

It may be understood that, the first end part 371 of the third radiator 37 is disposed as the ground end, and the ground end of the third radiator 37 is disposed close to an open end of the first radiator 31, to effectively implement that the composite antenna still has high isolation in a compact design, so as to ensure that the composite antenna has better antenna performance.

In this implementation, a ratio of the length of the third radiator 37 to a length of the first radiator 31 is within a range from 0.8 to 1.2. For example, the ratio of the length of the third radiator 37 to the length of the first radiator 31 may be 0.8, 0.83, 0.9, 0.93, 1, 1.02, 1.1, 1.15, or 1.2. In this implementation, the ratio of the length of the third radiator 37 to the length of the first radiator 31 is equal to 1. For example, both the length of the third radiator 37 and the length of the first radiator 31 are equal to 0.25.

It may be understood that, the ratio of the length of the third radiator 37 to the length of the first radiator 31 is set within the range from 0.8 to 1.2, to help both the first radiator 31 and the second radiator 32 excite a resonance mode under a radio frequency signal in a same frequency band.

In another implementation, the ratio of the length of the third radiator 37 to the length of the first radiator 31 may not fall within the range from 0.8 to 1.2.

Refer to FIG. 6D again. The composite antenna further includes a third matching circuit 38. The third matching circuit 38 is electrically connected between the transmission line 34 and the third feed point A3. The third matching circuit 38 may be an inductor. The feed source 33 inputs a radio frequency signal to the third feed point A3 through the transmission line 34. It may be understood that, compared with a quantity of resonance modes excited by the conventional IFA, in this implementation, a quantity of resonance modes excited by the composite antenna can also be increased. In this case, the composite antenna can implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this implementation can better meet requirements of electronic device communications systems.

In another implementation, the composite antenna may further include a fourth radiator, . . . , and an $N^{th}$ radiator, where N is an integer greater than 4.

Figure 7A:
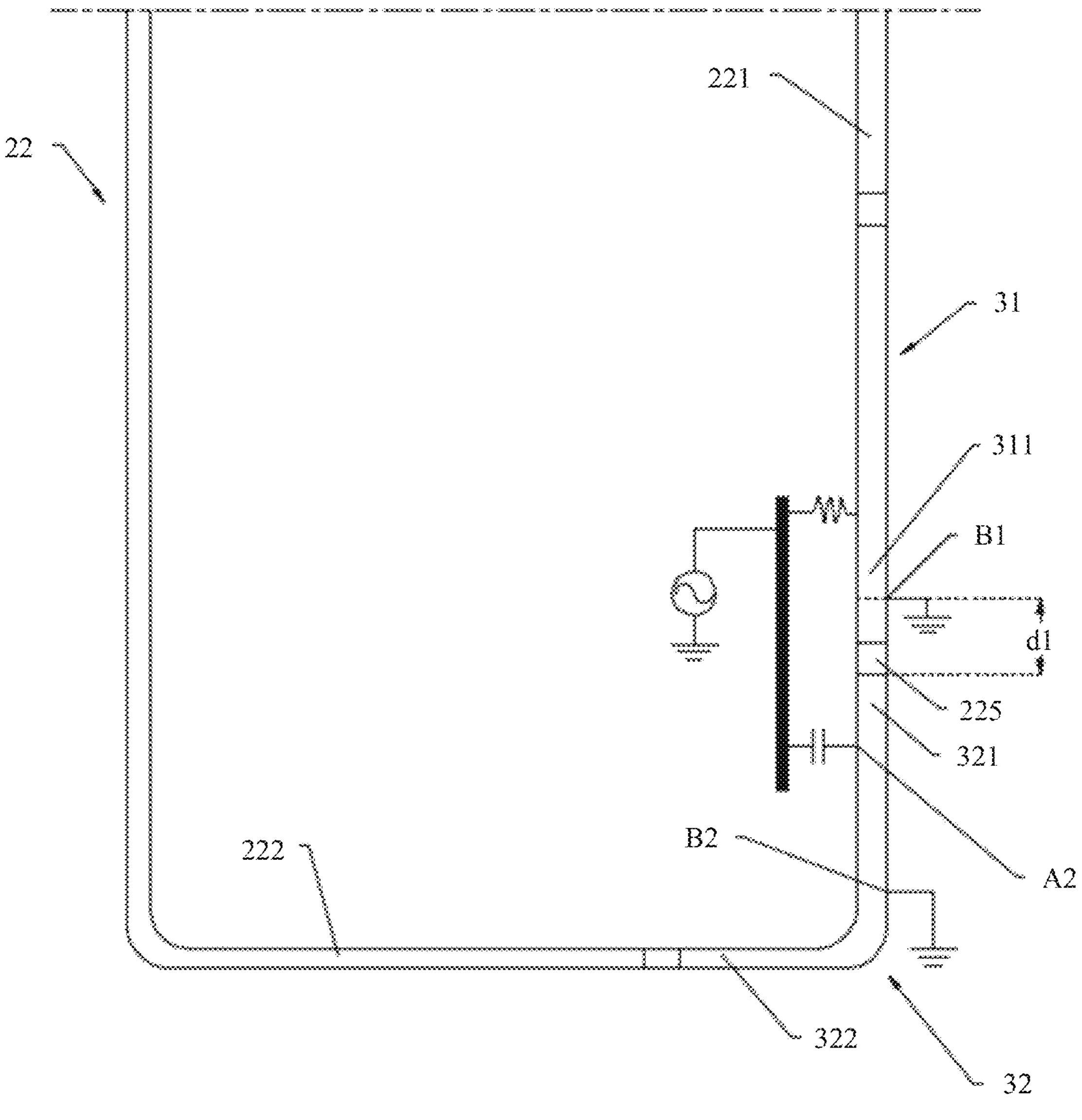
FIG. 7A is a schematic diagram of a structure of still another implementation of a composite antenna of the electronic device shown in FIG. 1.

In a second implementation, FIG. 7A is a schematic diagram of a structure of still another implementation of a composite antenna of the electronic device shown in FIG. 1. Most of technical content that is the same as the foregoing first implementation is not described again. The composite antenna includes a first radiator 31 and a second radiator 32. The first radiator 31 uses a radiator structure of an IFA. For a disposing manner of the first radiator 31, refer to the disposing manner of the first radiator 31 in the foregoing first implementation. Details are not described herein again. In addition, the second radiator 32 uses a radiator structure of a T antenna. The second radiator 32 may use the structure form of the frame 22. Specifically, an independent metal segment is isolated on the first long edge 221 and the first short edge 222. The metal segment forms the second radiator 32. Two ends of the second radiator 32 and the first radiator 31 that are close to each other form a first gap 225. For a width of the first gap 225, refer to the width of the first gap 225 in the first implementation. Details are not described herein again.

In another implementation, the second radiator 32 is not limited to a form of a frame 22 shown in FIG. 7A, and may alternatively use another structure manner. For details, refer to the setting manner of another structure of the second radiator 32 in the first implementation.

Refer to FIG. 7A again. A first end part 321 of the second radiator 32 is disposed close to the first radiator 31. A second end part 322 of the second radiator 32 is disposed away from the first radiator 31. The first end part 321 of the second radiator 32 and the second end part 322 of the second radiator 32 are both open ends.

In addition, the second radiator 32 includes a second feed point A2 and a second ground point B2. The second ground point B2 is located in the middle of the second radiator 32. A distance between the second ground point B2 and an end face of the first end part 321 of the second radiator 32 is within a range from one eighth wavelength (that is, 0.125 to one third wavelength (that is, approximately 0.34λ). For example, a distance between the second ground point B2 to the end face of the first end part 321 of the second radiator 32 is equal to 0.25λ. λ is a wavelength of an electromagnetic wave signal radiated and received by the composite antenna. In addition, in an actual application, the distance between the second ground point B2 to the end face of the first end part 321 of the second radiator 32 is difficult to be equal to 0.25, and a matching circuit may be disposed in the composite antenna, and the matching circuit is adjusted to compensate for such a structural error. In addition, as shown in FIG. 7A, the second feed point A2 is located on a side that is of the second ground point B2 and that is close to the first radiator 31. In another implementation, the second feed point A2 may alternatively be located on a side that is of the second ground point B2 and that is away from the first radiator 31.

In this implementation, a ratio of a length of the second radiator 32 to a length of the first radiator 31 is within a range from 1.6 to 2.4. For example, the ratio of the length of the second radiator 32 to the length of the first radiator 31 may be 1.6, 1.63, 1.7, 1.73, 1.8, 1.9, 2, 2.1, 2.2, 2.3, or 2.4. In this implementation, the ratio of the length of the second radiator 32 to the length of the first radiator 31 is equal to 2. For example, the length of the first radiator 31 is 0.25λ. The length of the second radiator 32 is 0.5λ. In addition, in an actual application, the ratio of the length of the second radiator 32 to the length of the first radiator 31 is difficult to be equal to 2, and a matching circuit may be disposed in the composite antenna, and the matching circuit is adjusted to compensate for such a structural error.

It may be understood that, the ratio of the length of the second radiator 32 to the length of the first radiator 31 is set within the range from 1.6 to 2.4, to help both the first radiator 31 and the second radiator 32 excite a resonance mode under a radio frequency signal in a same frequency band.

In another implementation, the ratio of the length of the second radiator 32 to the length of the first radiator 31 may not fall within the range from 1.6 to 2.4.

In this implementation, for a feeding manner of the composite antenna, refer to the feeding manner in the first implementation. Details are not described herein again. In another implementation, for a feeding manner of the composite antenna, refer to the feeding manner of the composite antenna in the extended implementation 3. For details, refer to the feeding manner of the composite antenna in the extended implementation 3. The details are not described herein again.

The following describes simulation of the composite antenna provided in the second implementation with reference to the accompanying drawings.

Figure 7B:
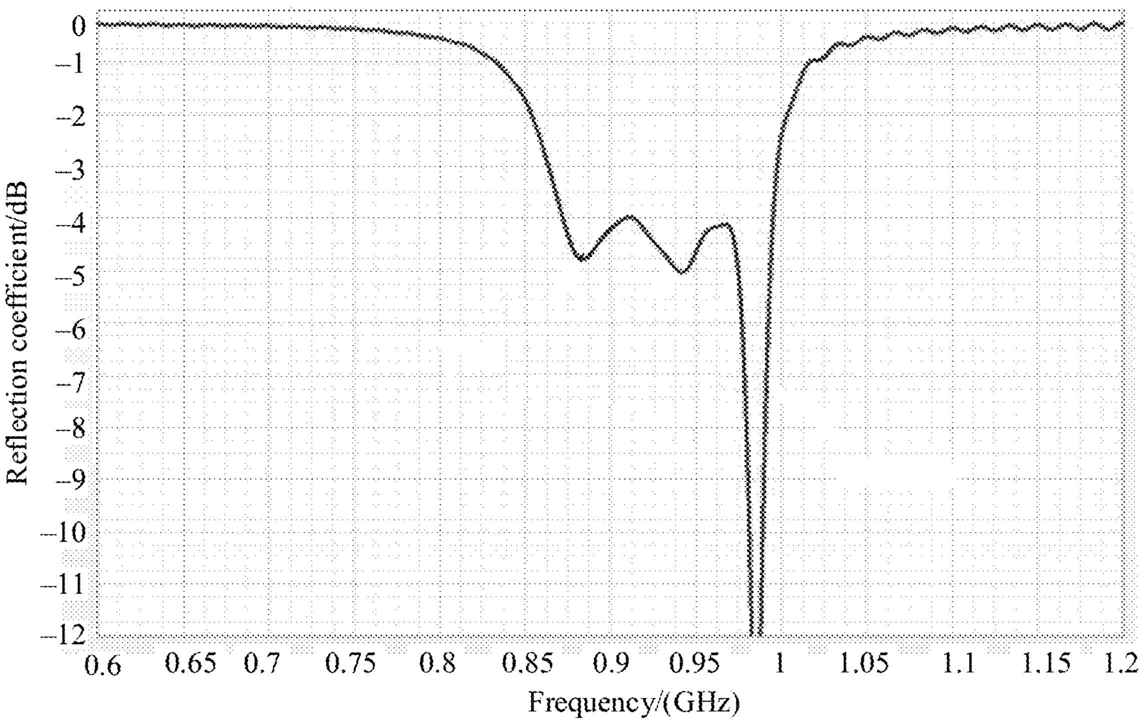
FIG. 7B is a schematic graph of an S11 curve of the composite antenna shown in FIG. 7A in free space.

FIG. 7B is a schematic graph of an S11 curve of the composite antenna shown in FIG. 7A in free space. The composite antenna may generate three resonance modes at 0.6 GHz to 1.2 GHz: a resonance "1" (0.88 GHz), a resonance "2" (0.94 GHz), and a resonance "3" (0.99 GHz). It is clear that, compared with the conventional technology in which one resonance mode is excited by the IFA, in this implementation, a quantity of resonance modes excited by the composite antenna can be increased by two. In this case, the composite antenna can implement wide frequency band coverage.

Figure 7C:
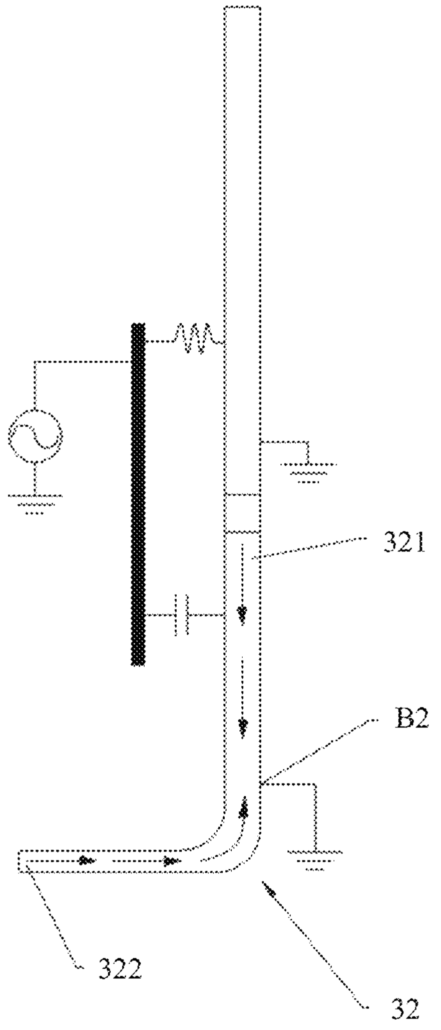
FIG. 7C is a schematic diagram of a flow direction of a current of the composite antenna shown in FIG. 7A under a resonance “1”
Figure 7D:
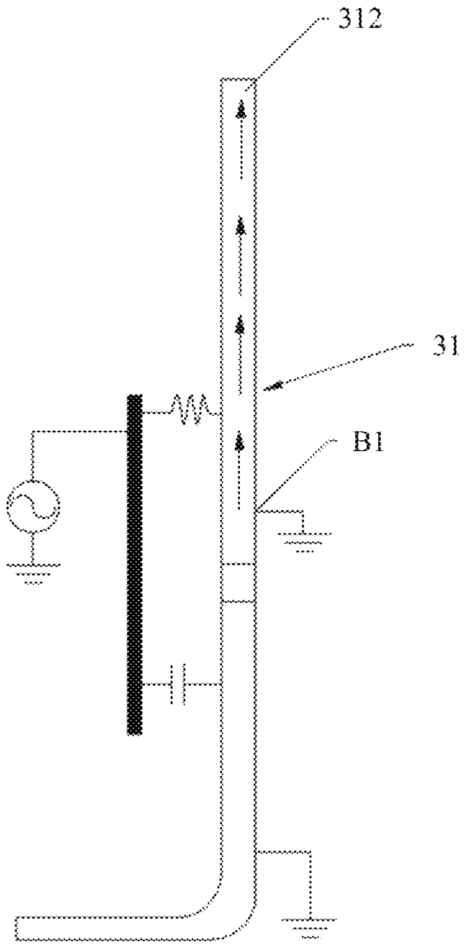
FIG. 7D is a schematic diagram of a flow direction of a current of the composite antenna shown in FIG. 7A under a resonance “2”
Figure 7E:
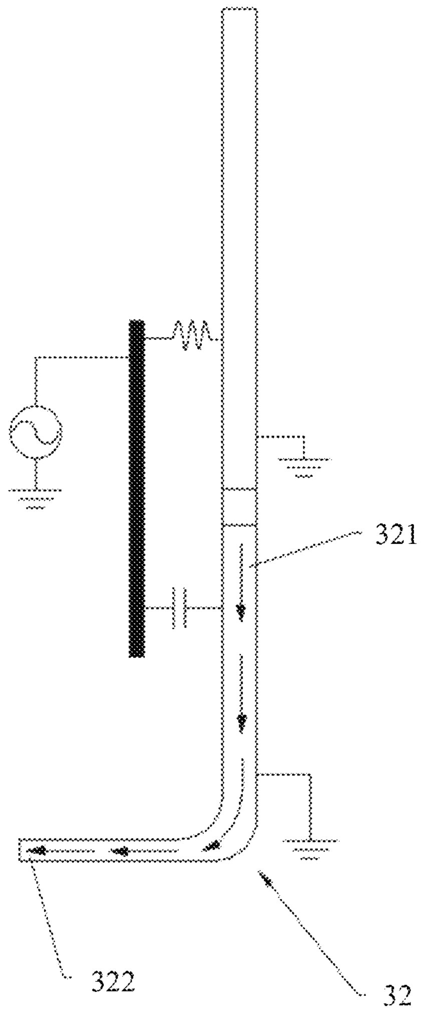
FIG. 7E is a schematic diagram of a flow direction of a current of the composite antenna shown in FIG. 7A under a resonance “3”

Refer to FIG. 7C, FIG. 7D, and FIG. 7E. FIG. 7C is a schematic diagram of a flow direction of a current of the composite antenna shown in FIG. 7A under the resonance "1". FIG. 7D is a schematic diagram of a flow direction of a current of the composite antenna shown in FIG. 7A under the resonance "2". FIG. 7E is a schematic diagram of a flow direction of a current of the composite antenna shown in FIG. 7A under the resonance "3". It can be learned from FIG. 7C that the current of the composite antenna under the resonance "1" mainly includes a current flowing from the first end part 321 of the second radiator 32 to the second ground point B2 and a current flowing from the second end part 322 of the second radiator 32 to the second ground point B2. It can be seen from FIG. 7D that the current of the composite antenna under the resonance "2" mainly includes a current flowing from the first ground point B1 to a second end part 312 of the first radiator 31. It can be seen from FIG. 7E that the current of the composite antenna under the resonance "3" mainly includes a current flowing from the first end part 321 of the second radiator 32 to the second end part 322 of the second radiator 32.

Figure 7F:
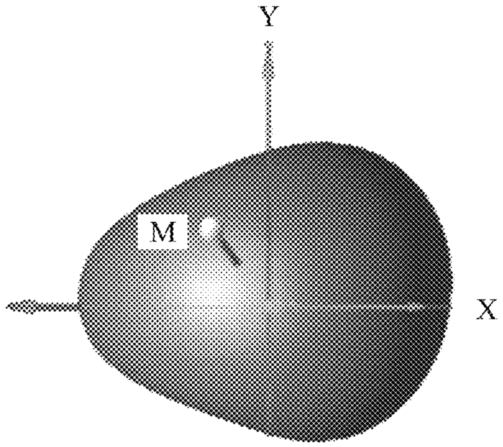
FIG. 7F is a schematic diagram of a radiation direction of the composite antenna shown in FIG. 7A under a resonance “1”
Figure 7G:
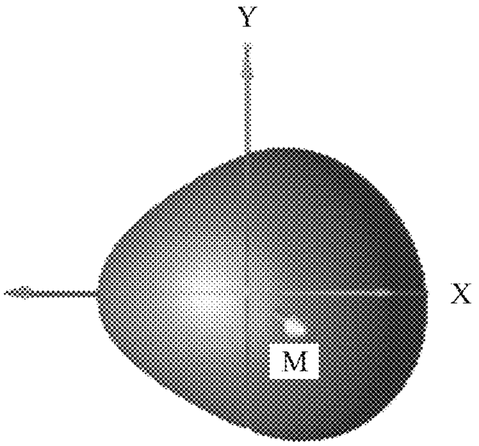
FIG. 7G is a schematic diagram of a radiation direction of the composite antenna shown in FIG. 7A under a resonance “2”
Figure 7H:
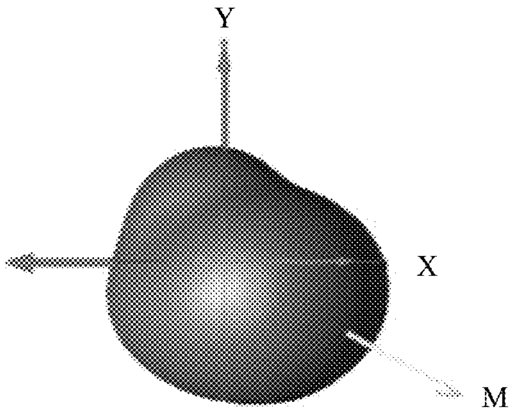
FIG. 7H is a schematic diagram of a radiation direction of the composite antenna shown in FIG. 7A under a resonance “3”

FIG. 7F is a schematic diagram of a radiation direction of the composite antenna shown in FIG. 7A under the resonance "1". FIG. 7G is a schematic diagram of a radiation direction of the composite antenna shown in FIG. 7A under the resonance "2". FIG. 7H is a schematic diagram of a radiation direction of the composite antenna shown in FIG. 7A under the resonance "3". In the schematic diagram of the radiation direction, a region with a deep grayscale represents strong radiation, and a white region represents weak radiation. In addition, a direction X in each of the accompanying drawings is a width direction of the electronic device 100, and a direction Y is a length direction of the electronic device 100. A direction M in each of the accompanying drawings is a main radiation direction of each resonance. It can be seen from FIG. 7F, FIG. 7G, and FIG. 7H that radiation directions of the composite antenna in the resonance "1", the resonance "2", and the resonance "3" are different.

Figure 7I:
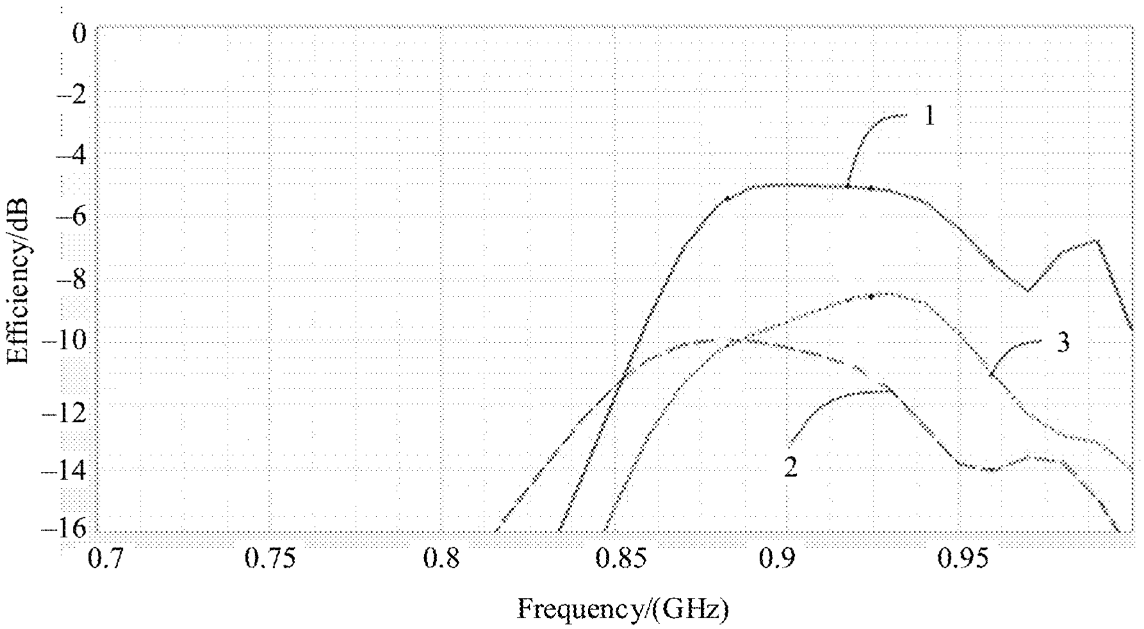
FIG. 7I is a system efficiency curve of the composite antenna shown in FIG. 7A in a free space environment, a beside head and hand left environment, and a beside head and hand right environment.

FIG. 7I is a system efficiency curve of the composite antenna shown in FIG. 7A in a free space environment, a beside head and hand left environment, and a beside head and hand right environment. A line 1 in FIG. 7I indicates system efficiency of the composite antenna in the free space environment. A line 2 in FIG. 7I indicates system efficiency of the composite antenna in the beside head and hand left environment. A line 3 in FIG. 7I indicates system efficiency of the composite antenna in the beside head and hand right environment. It can be seen from FIG. 7I that, in the free space environment, when the system efficiency of the composite antenna is −7 dB, a corresponding frequency band bandwidth of the composite antenna may be greater than 90 MHz. In the beside head and hand left environment, when the system efficiency of the composite antenna is −11 dB, a corresponding frequency band bandwidth of the composite antenna may be greater than 90 MHz. In the beside head and hand right environment, when the system efficiency of the composite antenna is −10 dB, a corresponding frequency band bandwidth of the composite antenna may be greater than 90 MHz. Obviously, compared with the conventional IFA, when the composite antenna in this implementation is in the free space environment, the beside head and hand left environment, or the beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

Figure 7J:
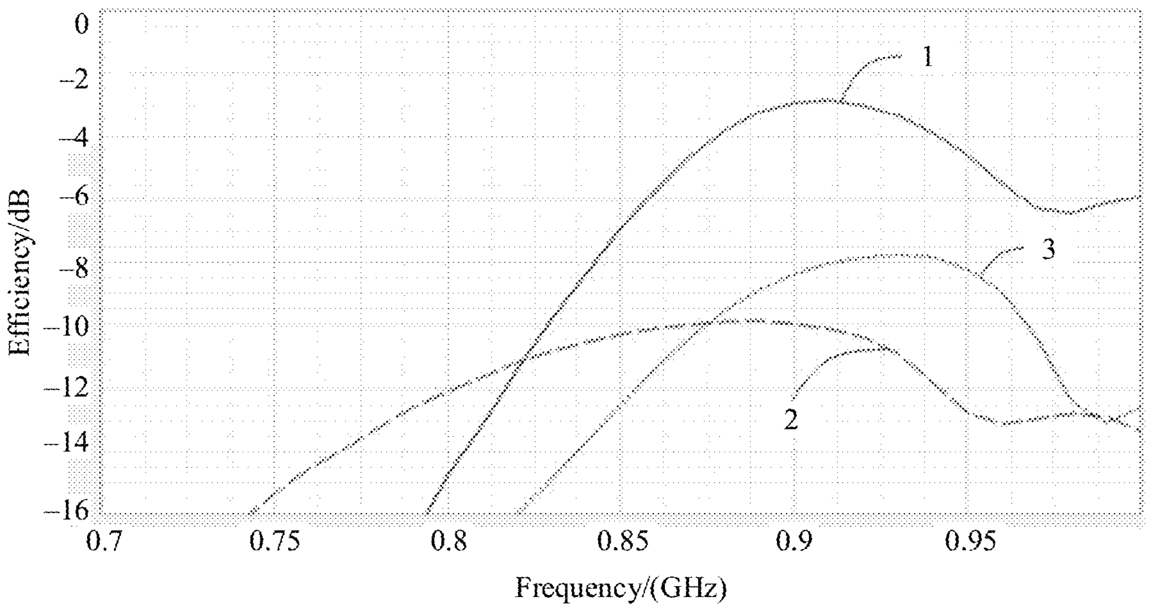
FIG. 7J is a radiation efficiency curve of the composite antenna shown in FIG. 7A in a beside head and hand left environment, a beside head and hand right environment, and a free space environment.

FIG. 7J is a radiation efficiency curve of the composite antenna shown in FIG. 7A in a beside head and hand left environment, a beside head and hand right environment, and a free space environment. A line 1 in FIG. 7J indicates radiation efficiency of the composite antenna in the free space environment. A line 2 in FIG. 7J indicates radiation efficiency of the composite antenna in the beside head and hand left environment. A line 3 in FIG. 7J indicates radiation efficiency of the composite antenna in the beside head and hand right environment. It can be seen in FIG. 7J that, when the composite antenna is in the free space environment, the beside head and hand left environment, or the beside head and hand right environment, the radiation efficiency of the composite antenna is high, and the frequency band bandwidth of the composite antenna is large. In addition, there is a small difference between the radiation efficiency of the IFA in the beside head and hand left environment and the radiation efficiency of the IFA in the beside head and hand right environment.

In another implementation, the composite antenna of the second implementation may alternatively include the third radiator 37 of the composite antenna in the extended implementation 2 and the third radiator 37 of the extended implementation 4. For details, refer to the disposition manner of the third radiator 37 in the extended implementation 2 and the disposition manner of the third radiator 37 in the extended implementation 4. Details are not described herein again.

Figure 7K:
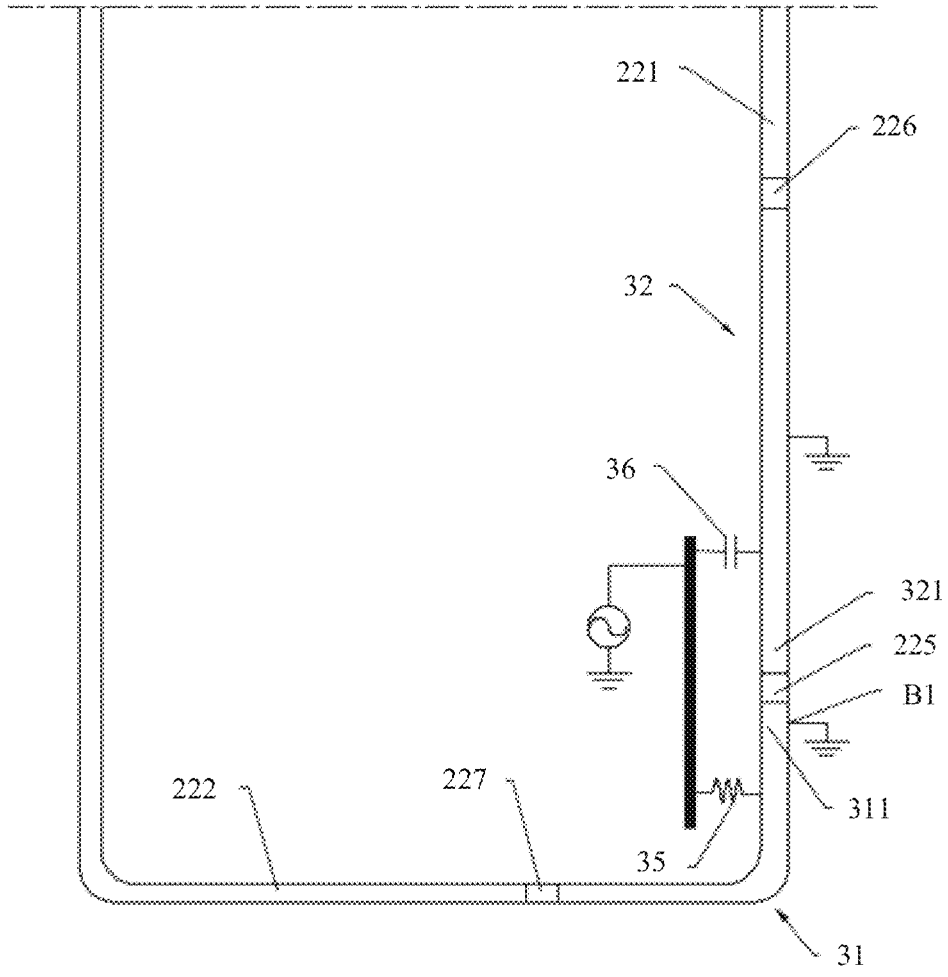
FIG. 7K is a schematic diagram of a structure of yet another implementation of a composite antenna of the electronic device shown in FIG. 1.

In an extended implementation 1, FIG. 7K is a schematic diagram of a structure of yet another implementation of a composite antenna of the electronic device shown in FIG. 1. Technical content that is the same as the foregoing second implementation is not described again. The composite antenna includes a first radiator 31 and a second radiator 32. The first radiator 31 uses a radiator structure of an IFA. The second radiator 32 uses a radiator structure of a T antenna. Different from the second implementation, the first radiator 31 is located on a bottom side of the second radiator 32. Specifically, a metal segment is isolated on the first long edge 221 by a first gap 225 and a second gap 226, to form the second radiator 32. A metal segment is isolated on the first long edge 221 and the first short edge 222 by the first gap 225 and a third gap 227, to form the first radiator 31.

In this implementation, for a feeding manner of the composite antenna, refer to the feeding manner in the second implementation. Details are not described herein again. Different from the second implementation, a first matching circuit 35 is located on a bottom side of a second matching circuit 36 in the implementation. In another implementation, for a feeding manner of the composite antenna, refer to the feeding manner of the composite antenna in the extended implementation 3 of the first implementation. For details, refer to the feeding manner of the composite antenna in the extended implementation 3. The details are not described herein again.

It may be understood that, the composite antenna in this implementation can occupy small space, and a quantity of resonance modes excited by the composite antenna can also be increased by two. In this case, the composite antenna can implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

Figure 7L:
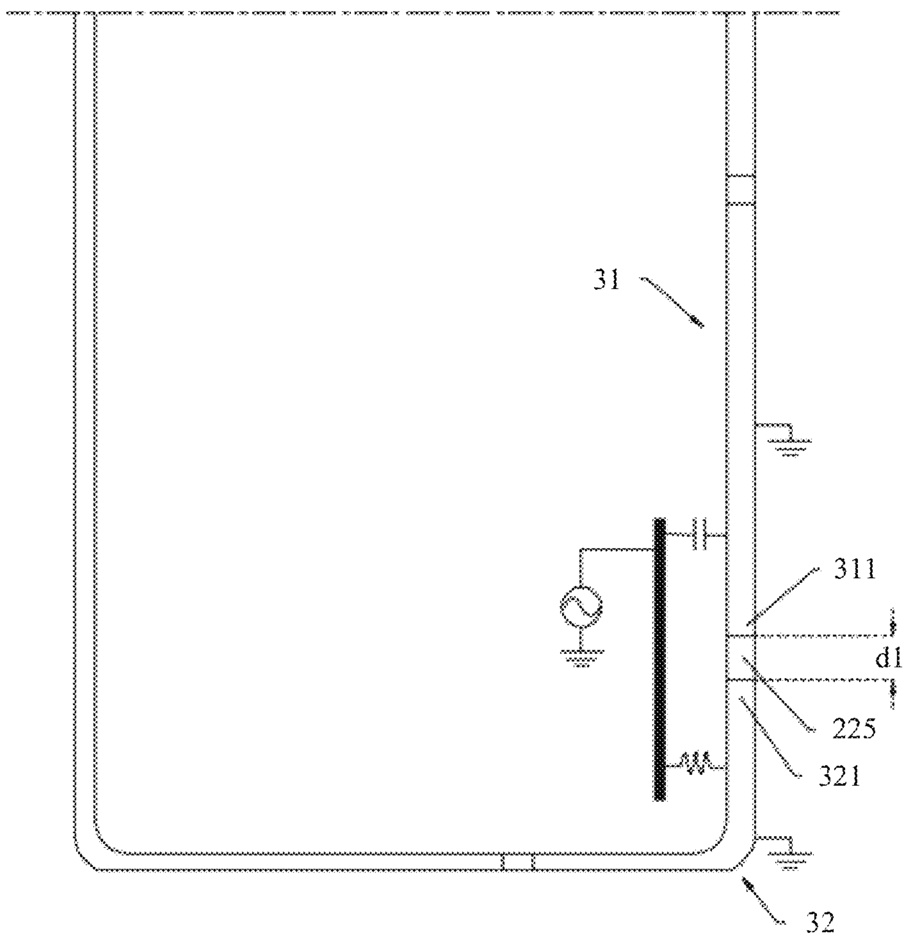
FIG. 7L is a schematic diagram of a structure of yet still another implementation of a composite antenna of the electronic device shown in FIG. 1.

In an extended implementation 2, FIG. 7L is a schematic diagram of a structure of yet still another implementation of a composite antenna of the electronic device shown in FIG. 1. Technical content that is the same as the foregoing second implementation and the extended implementation 1 is not described again. The composite antenna includes a first radiator 31 and a second radiator 32. Both the first radiator 31 and the second radiator 32 use a radiator structure of a T antenna. For a disposing form of the first radiator 31, refer to the disposing form of the second radiator 32 in the second implementation and the disposing form of the second radiator 32 in the extended implementation 1. Details are not described herein again. Two ends of the second radiator 32 and the first radiator 31 that are close to each other form a first gap 225. For a width of the first gap 225, refer to the width of the first gap 225 in the first implementation. Details are not described herein again.

In this implementation, for a feeding manner of the composite antenna, refer to the feeding manner in the second implementation. Details are not described herein again. In another implementation, for a feeding manner of the composite antenna, refer to the feeding manner of the composite antenna in the extended implementation 3 of the first implementation. For details, refer to the feeding manner of the composite antenna in the extended implementation 3. The details are not described herein again.

It may be understood that, a quantity of resonance modes excited by the composite antenna in this implementation can be increased by two. In this case, the composite antenna can implement wide frequency band coverage. In addition, when the composite antenna in this implementation is in a free space environment, a beside head and hand left environment, or a beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

Figure 8A:
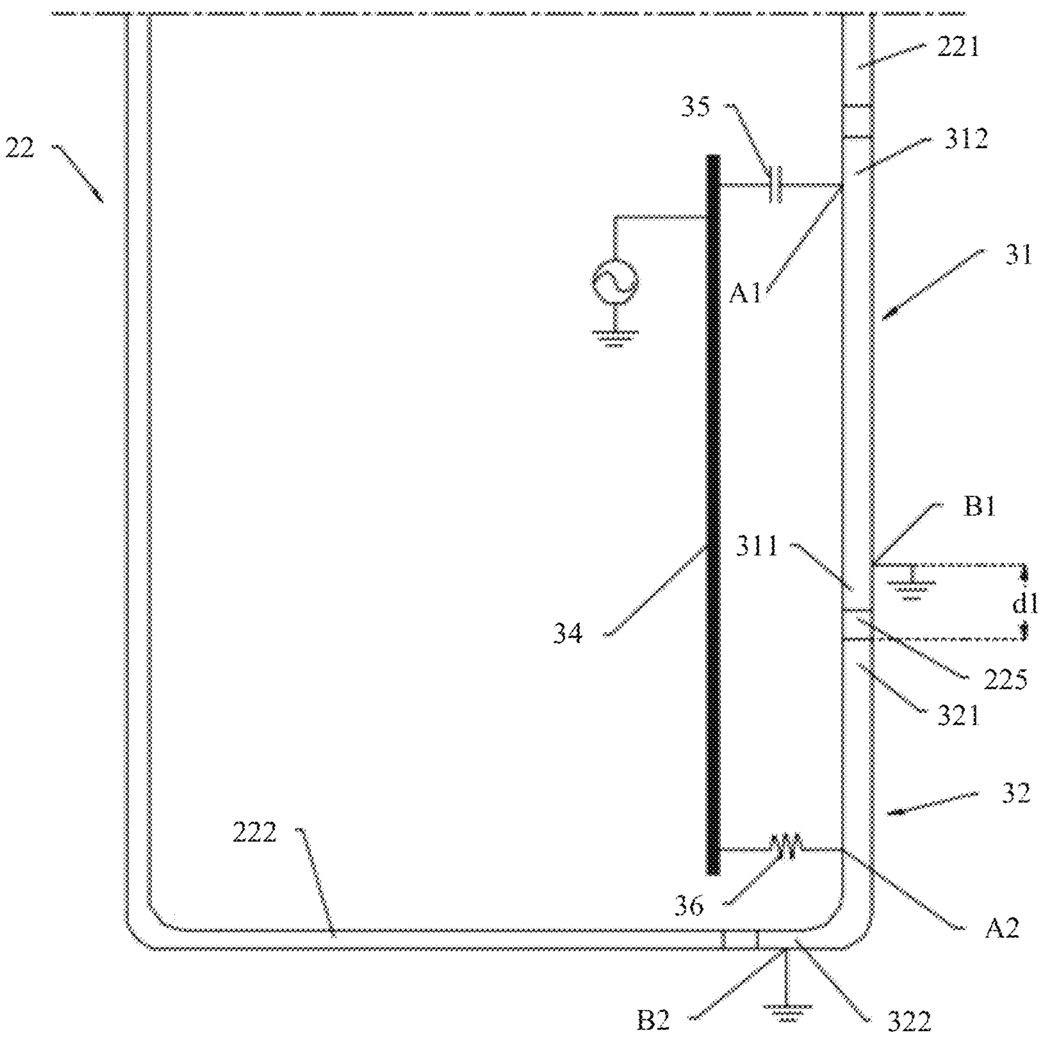
FIG. 8A is a schematic diagram of a structure of another implementation of a composite antenna of the electronic device shown in FIG. 1.

In a third implementation, FIG. 8A is a schematic diagram of a structure of another implementation of a composite antenna of the electronic device shown in FIG. 1. Technical content that is the same as the foregoing first implementation and second implementation is not described again. The composite antenna includes a first radiator 31 and a second radiator 32. The first radiator 31 uses a radiator structure of a CRLH antenna. The second radiator 32 uses a radiator structure of an IFA. The first radiator 31 and the second radiator 32 may use the structure form of the frame 22, or may alternatively another structure form. Specifically, refer to the structural forms of the first radiator 31 and the second radiator 32 in the first implementation. Details are not described herein again. Two ends of the second radiator 32 and the first radiator 31 that are close to each other form a first gap 225. For a width of the first gap 225, refer to the width of the first gap 225 in the first implementation. Details are not described herein again.

Refer to FIG. 8A again. The first radiator 31 includes a first end part 311 and a second end part 312. The first end part 311 of the first radiator 31 is disposed close to the second radiator 32. The second end part 312 of the first radiator 31 is disposed away from the second radiator 32. The second end part 312 of the first radiator 31 is an open end.

In addition, the first radiator 31 includes a first feed point A1 and a first ground point B1. The first ground point B1 is located on the first end part 311 of the first radiator 31. The first feed point A1 is located on a side that is of the first ground point B1 and that is away from the second radiator 32. In addition, a length of the first radiator 31 between the first feed point A1 and the first ground point B1 is greater than half of a total length of the first radiator 31, that is, a length of the first radiator 31 between the first feed point A1 and a ground end of the first radiator 31 is greater than half of the total length of the first radiator 31. In this case, the first feed point A1 is disposed away from the first ground point B1.

Refer to FIG. 8A again. The second radiator 32 includes a first end part 321 and a second end part 322 disposed away from the first end part 321. The first end part 321 of the second radiator 32 is disposed close to the first radiator 31. The first end part 321 of the second radiator 32 is an open end.

In addition, the second radiator 32 includes a second feed point A2 and a second ground point B2. The second ground point B2 is located on the second end part 322 of the second radiator 32. The second feed point A2 is located on a side that is of the second ground point B2 and that is close to the first radiator 31. In addition, a length of the second radiator 32 between the second feed point A2 and the second ground point B2 is less than or equal to half of a total length of the second radiator 32, that is, a length of the second radiator 32 between the second feed point A2 and a ground end of the second radiator 32 is less than or equal to half of the total length of the second radiator 32. In this case, the second feed point A2 is disposed close to the second ground point B2.

In this implementation, for a ratio of the length of the first radiator 31 to the length of the second radiator 32, refer to the ratio of the length of the first radiator 31 to the length of the second radiator 32 in the foregoing first implementation. Details are not described herein again.

In this implementation, for a feeding manner of the composite antenna, refer to the feeding manner in the first implementation. Details are not described herein again. It should be noted that a distance between the first feed point A1 and the second feed point A2 in this implementation is large. In this case, a transmission line 34 in this implementation may mainly use a microstrip or a flexible circuit board. In addition, for example, a first matching circuit 35 may be a capacitor. A second matching circuit 36 may be an inductor. In another implementation, for a feeding manner of the composite antenna, refer to the feeding manner of the composite antenna in the extended implementation 3 of the first implementation. For details, refer to the feeding manner of the composite antenna in the extended implementation 3. The details are not described herein again.

The following describes simulation of the composite antenna provided in the third implementation with reference to the accompanying drawings.

Figure 8B:
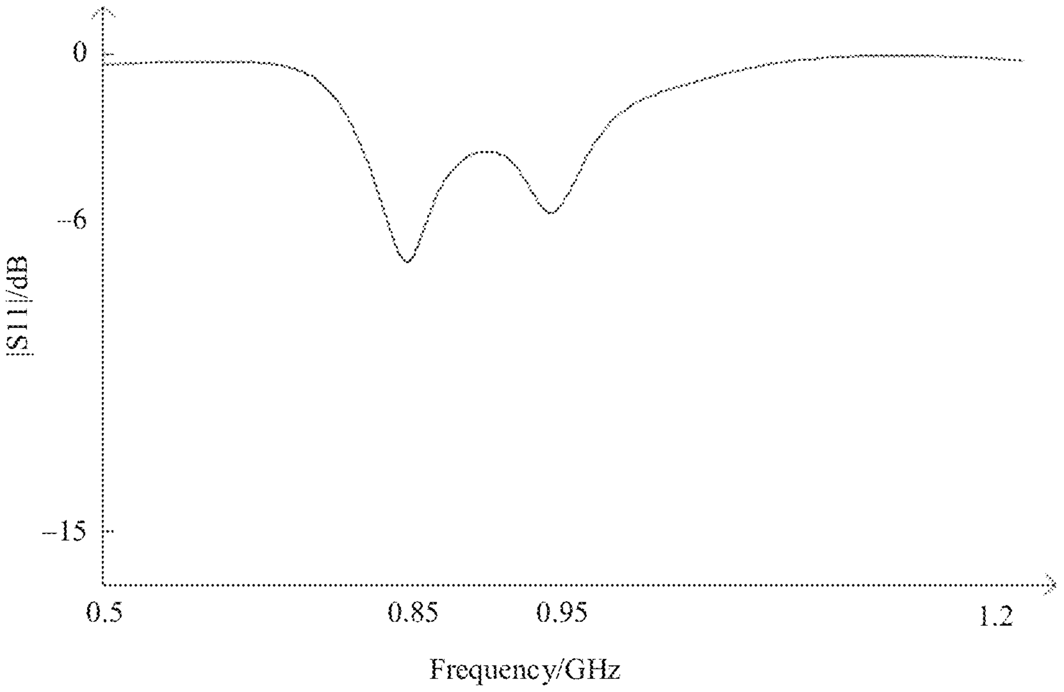
FIG. 8B is a schematic graph of an S11 curve of the composite antenna shown in FIG. 8A in free space.

FIG. 8B is a schematic graph of an S11 curve of the composite antenna shown in FIG. 8A in free space. The composite antenna may generate two resonances at 0.5 GHz to 1.2 GHz: a resonance “1” (0.88 GHz) and a resonance “2” (0.95 GHz). It is clear that, compared with the conventional technology in which one resonance mode is excited by the IFA, in this implementation, a quantity of resonance modes excited by the composite antenna can be increased by one. In this case, the composite antenna can implement wide frequency band coverage.

Figure 8C:
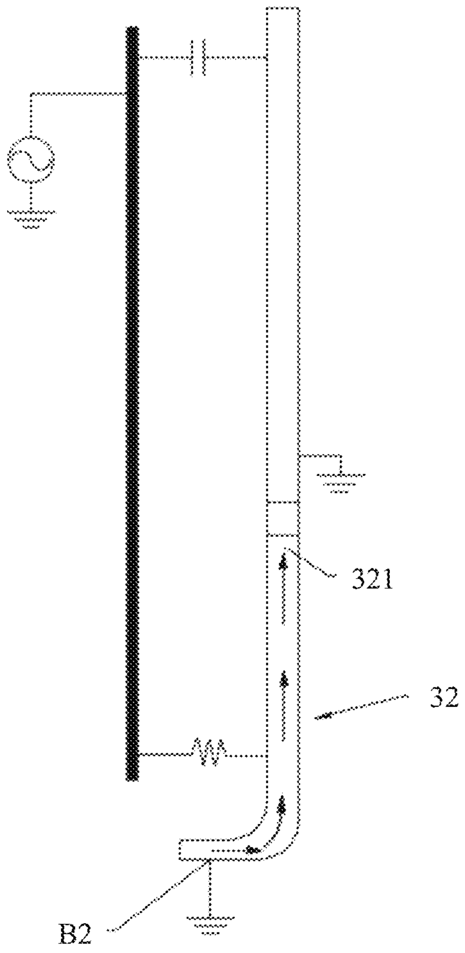
FIG. 8C is a schematic diagram of a flow direction of a current of the composite antenna shown in FIG. 8A under a resonance “1”
Figure 8D:
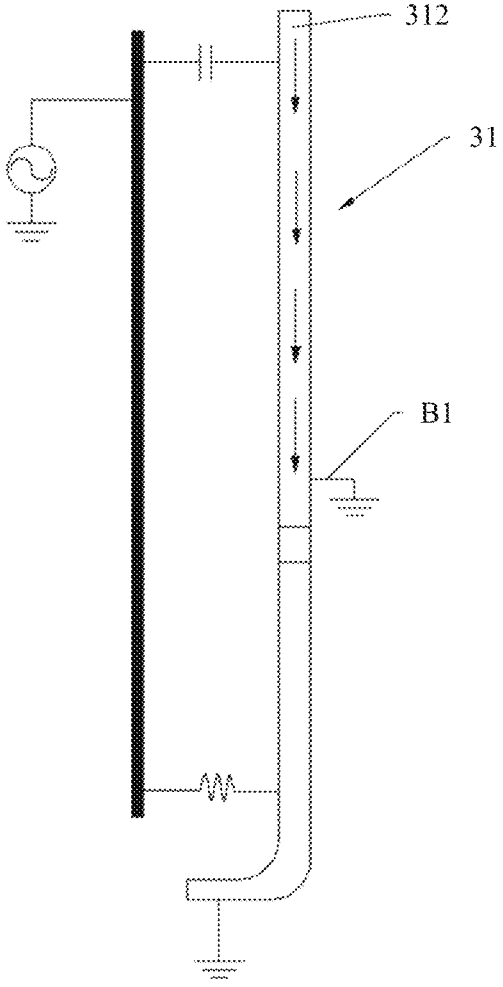
FIG. 8D is a schematic diagram of a flow direction of a current of the composite antenna shown in FIG. 8A under a resonance “2”

Refer to FIG. 8C and FIG. 8D. FIG. 8C is a schematic diagram of a flow direction of a current of the composite antenna shown in FIG. 8A under the resonance “1”. FIG. 8D is a schematic diagram of a flow direction of a current of the composite antenna shown in FIG. 8A under the resonance “2”. It can be seen from FIG. 8C that the current of the composite antenna under the resonance “1” mainly includes a current flowing from the second ground point B2 to the first end part 321 of the second radiator 32. It can be seen from FIG. 8D that the current of the composite antenna under the resonance “2” mainly includes a current flowing from the second end part 312 of the first radiator 31 to the first ground point B1.

Figure 8E:
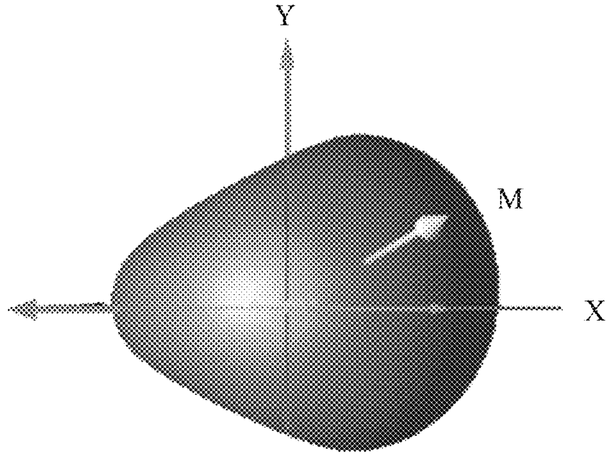
FIG. 8E is a schematic diagram of a radiation direction of the composite antenna shown in FIG. 8A under a resonance "1"
Figure 8F:
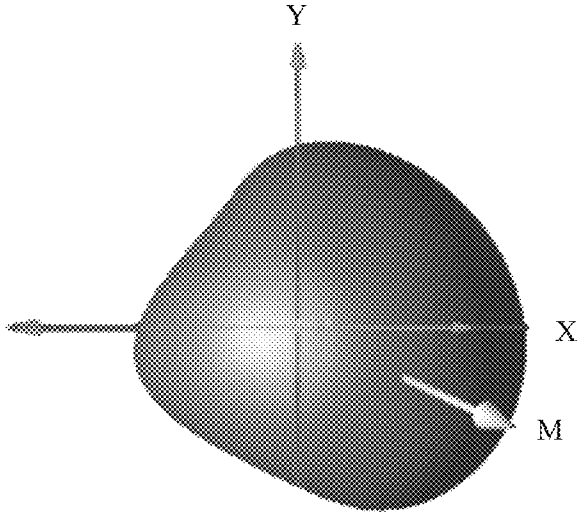
FIG. 8F is a schematic diagram of a radiation direction of the composite antenna shown in FIG. 8A under a resonance "2"

FIG. 8E is a schematic diagram of a radiation direction of the composite antenna shown in FIG. 8A under the resonance “1”. FIG. 8F is a schematic diagram of a radiation direction of the composite antenna shown in FIG. 8A under the resonance “2”. In the schematic diagram of the radiation direction, a region with a deep grayscale represents strong radiation, and a white region represents weak radiation. In addition, a direction X in each of the accompanying drawings is the width direction of the electronic device 100, and a direction Y is the length direction of the electronic device 100. A direction M in each of the accompanying drawings is a main radiation direction of each resonance. It can be seen from FIG. 8E and FIG. 8F that radiation directions of the composite antenna in the resonance "1" and the resonance "2" are different.

Figure 8G:
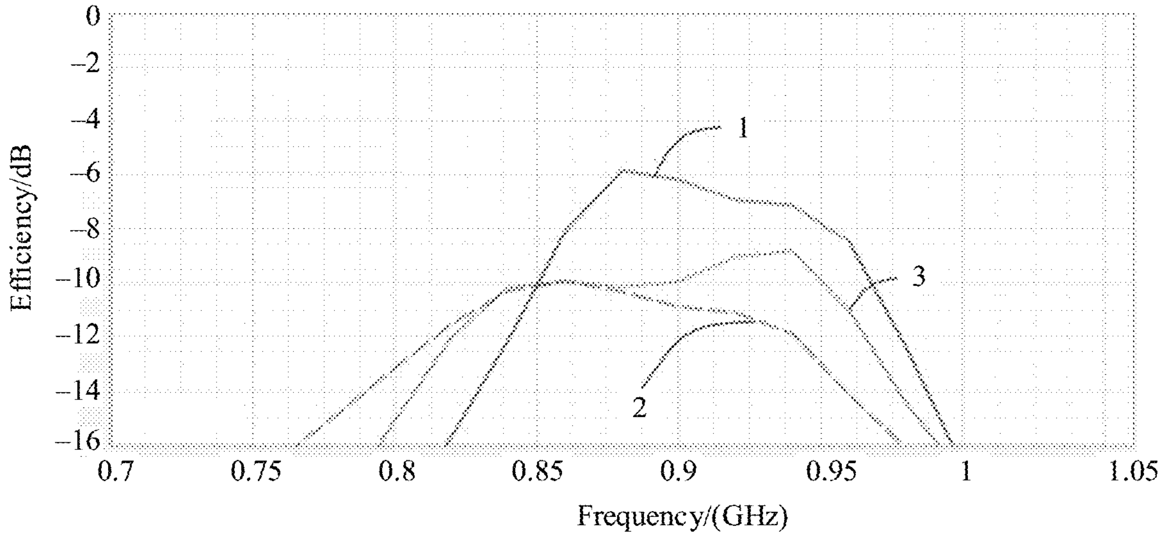
FIG. 8G is a system efficiency curve of the composite antenna shown in FIG. 8A in a free space environment, a beside head and hand left environment, and a beside head and hand right environment.

FIG. 8G is a system efficiency curve of the composite antenna shown in FIG. 8A in a free space environment, a beside head and hand left environment, and a beside head and hand right environment. A line 1 in FIG. 8G indicates system efficiency of the composite antenna in the free space environment. A line 2 in FIG. 8G indicates system efficiency of the composite antenna in the beside head and hand left environment. A line 3 in FIG. 8G indicates system efficiency of the composite antenna in the beside head and hand right environment. In the free space environment, when the system efficiency of the composite antenna is −7 dB, a corresponding frequency band bandwidth of the composite antenna may be greater than 90 MHz. In the beside head and hand left environment, when the system efficiency of the composite antenna is −11 dB, a corresponding frequency band bandwidth of the composite antenna may be greater than 90 MHz. In the beside head and hand right environment, when the system efficiency of the composite antenna is −10 dB, a corresponding frequency band bandwidth of the composite antenna may be greater than 100 MHz. Obviously, compared with the conventional IFA, when the composite antenna in this implementation is in the free space environment, the beside head and hand left environment, or the beside head and hand right environment, the composite antenna has high system efficiency and a large frequency band bandwidth. In addition, there is a small difference between the system efficiency of the IFA in the beside head and hand left environment and the system efficiency of the IFA in the beside head and hand right environment. Therefore, the composite antenna in this application can better meet requirements of electronic device communications systems.

Figure 8H:
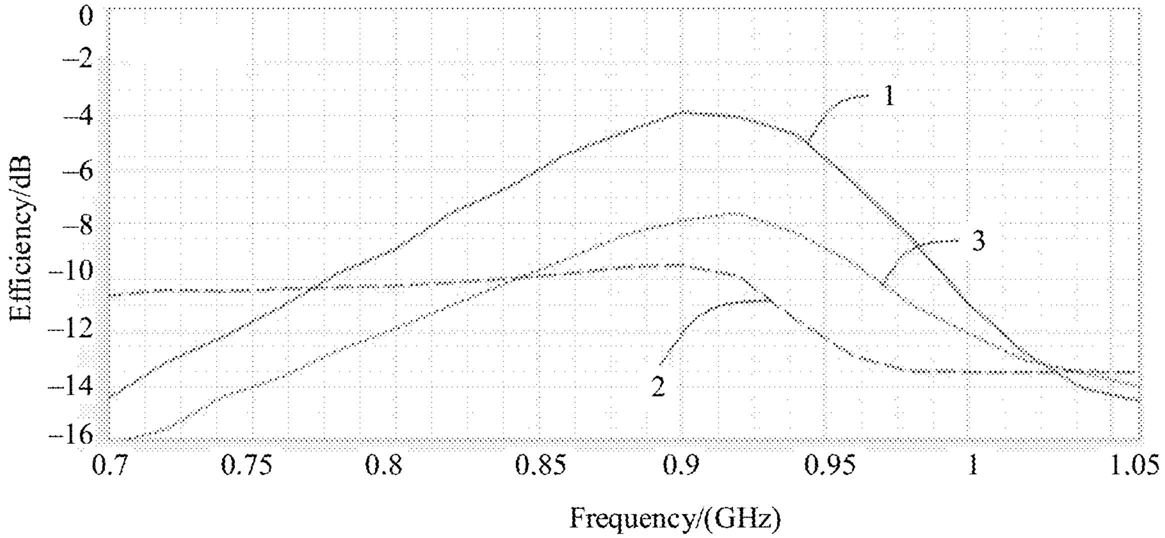
FIG. 8H is a radiation efficiency curve of the composite antenna shown in FIG. 8A in a beside head and hand left environment, a beside head and hand right environment, and a free space environment.

FIG. 8H is a radiation efficiency curve of the composite antenna shown in FIG. 8A in a beside head and hand left environment, a beside head and hand right environment, and a free space environment. A line 1 in FIG. 8H indicates radiation efficiency of the composite antenna in the free space environment. A line 2 in FIG. 8H indicates radiation efficiency of the composite antenna in the beside head and hand left environment. A line 3 in FIG. 8H indicates radiation efficiency of the composite antenna in the beside head and hand right environment. When the composite antenna is in the free space environment, the beside head and hand left environment, or the beside head and hand right environment, the composite antenna has high radiation efficiency and a large frequency band bandwidth. In addition, there is a small difference between the radiation efficiency of the IFA in the beside head and hand left environment and the radiation efficiency of the IFA in the beside head and hand right environment.

In another implementation, the composite antenna of the third implementation may alternatively include the third radiator 37 of the composite antenna in the extended implementation 2 and the third radiator 37 in the extended implementation 4. For details, refer to the disposition manner of the third radiator 37 in the extended implementation 2 and the disposition manner of the third radiator 37 in the extended implementation 4. The details are not described herein again.

The foregoing specifically describes several manners of disposing the composite antenna with reference to related accompanying drawings. In addition, in distributed feeding, the composite antenna can occupy small space in an environment in which antenna arrangement is tight, and the composite antenna generates a plurality of resonance modes, to implement wide frequency band coverage. In addition, in the free space environment, the beside head and hand left environment, or the beside head and hand right environment, the composite antenna has high system efficiency and a large frequency band bandwidth. Moreover, there is a small difference between the efficiency of the composite antenna in the beside head and hand left environment and the efficiency of the composite antenna in the beside head and hand right environment, and antenna performance is better. Therefore, the composite antenna in this application can better meet requirements of electronic device communications systems.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus, comprising:

a feed source, a transmission line, a first radiator, and a second radiator, wherein the transmission line is electrically connected to the feed source, and wherein at least one of the first and second radiators is part of an inverted-F antenna;

the first radiator comprises a first end part and a second end part, the second radiator comprises a first end part and a second end part, the first end part of the second radiator is disposed closer to the first end part of the first radiator than the second end part of the second radiator, a first gap is formed between the first end part of the first radiator and the first end part of the second radiator, the first end part of the first radiator is grounded, and the first end part of the second radiator is an open end; and the first radiator comprises a first feed point, the second radiator comprises a second feed point, the first feed point and the second feed point are both electrically connected to the transmission line, and the feed source is configured to simultaneously input a same radio frequency signal toward the first feed point and the second feed point via the transmission line.

2. The antenna apparatus according to claim 1, wherein a width d1 of the first gap satisfies:

$$0<d1\leq 10\text{ mm}.$$

3. The antenna apparatus according to claim 1, wherein both the first radiator and the second radiator generate at least one resonance mode under the radio frequency signal.

4. The antenna apparatus according to claim 1, wherein the frequency band of the radio frequency signal is within a range from 600 megahertz to 1000 megahertz.

5. The antenna apparatus according to claim 1, wherein a ratio of a length of the first radiator to a length of the second radiator is within a range from 0.8 to 1.2.

6. The antenna apparatus according to claim 5, wherein the second end part of the first radiator is an open end, and a length of the first radiator between the first feed point and the first end part of the first radiator is less than or equal to half of a total length of the first radiator.

7. The antenna apparatus according to claim 6, wherein the second end part of the second radiator is grounded, and a length of the second radiator between the second feed point and the second end part of the second radiator is greater than half of a total length of the second radiator.

8. The antenna apparatus according to claim 1, wherein a ratio of a length of the second radiator to a length of the first radiator is within a range from 1.6 to 2.4.

9. The antenna apparatus according to claim 1, wherein the antenna apparatus further comprises a first matching circuit and a second matching circuit, the first matching circuit is electrically connected between the transmission line and the first feed point, and the second matching circuit is electrically connected between the transmission line and the second feed point.

10. The antenna apparatus according to claim 1, wherein the antenna apparatus further comprises a third radiator, the third radiator is located on a side that is of the first radiator and that is away from the second radiator, a second gap is formed between the third radiator and the second end part of the first radiator, and the third radiator is coupled to the first radiator.

11. The antenna apparatus according to claim 1, wherein the antenna apparatus further comprises a third radiator, the third radiator is located on a side that is of the first radiator and that is away from the second radiator, the third radiator comprises a first end part and a second end part, the first end part of the third radiator is disposed closer to the second end part of the first radiator than the second end part of the third radiator, and a second gap is formed between the first end part of the third radiator and the second end part of the first radiator, wherein a width d2 of the second gap satisfies: $0<d2\leq 10$ millimeters;

the second end part of the first radiator is an open end, and the first end part of the third radiator is grounded; and the third radiator comprises a third feed point, the third feed point is electrically connected to the transmission line, and the transmission line is further configured to input the radio frequency signal to the third feed point.

12. The antenna apparatus according to claim 1, wherein the feed source comprises a positive electrode and a negative electrode, the positive electrode of the feed source is electrically connected to the transmission line, and the negative electrode of the feed source is grounded.

13. The antenna apparatus according to claim 1, wherein the transmission line comprises a first part and a second part that are spaced from each other;

one end of the first part is electrically connected to the first feed point, and the other end of the first part is grounded; and one end of the second part is electrically connected to the second feed point, and the other end of the second part is grounded; and the feed source comprises a positive electrode and a negative electrode, the positive electrode of the feed source is electrically connected to the first part, and the negative electrode of the feed source is electrically connected to the second part.

14. A mobile phone, comprising:

an antenna apparatus comprising a feed source, a transmission line, a first radiator, and a second radiator, wherein the transmission line is electrically connected to the feed source, wherein at least one of the first and second radiators is part of an inverted-F antenna, and wherein the first and second radiators are at a bezel of the mobile phone;

the first radiator comprises a first end part and a second end part, the second radiator comprises a first end part and a second end part, the first end part of the second radiator is disposed closer to the first end part of the first radiator than the second end part of the second radiator, a first gap is formed between the first end part of the first radiator and the first end part of the second radiator, the first end part of the first radiator is grounded, and the first end part of the second radiator is an open end; and the first radiator comprises a first feed point, the second radiator comprises a second feed point, the first feed point and the second feed point are both electrically connected to the transmission line, and the feed source is configured to simultaneously input a same radio frequency signal toward the first feed point and the second feed point via the transmission line.

15. The mobile phone according to claim 14, wherein the electronic device comprises a frame, the frame comprises a first short edge, and a first long edge and a second long edge that are disposed opposite to each other, the first short edge is connected between the first long edge and the second long edge, a first part of the first long edge forms one of the first radiator and the second radiator, a second part of the first long edge and the first short edge form the other one of the first radiator and the second radiator, and the transmission line is disposed close to the first long edge relative to the second long edge.

16. The mobile phone according to claim 14, wherein a width d1 of the first gap satisfies:

$$0<d1\leq 10 \text{ mm}.$$

17. The mobile phone according to claim 14, wherein a ratio of a length of the first radiator to a length of the second radiator is within a range from 0.8 to 1.2.

18. The mobile phone according to claim 17, wherein the second end part of the first radiator is an open end, and a length of the first radiator between the first feed point and the first end part of the first radiator is less than or equal to half of a total length of the first radiator.

19. The mobile phone according to claim 18, wherein the second end part of the second radiator is grounded, and a length of the second radiator between the second feed point and the second end part of the second radiator is greater than half of a total length of the second radiator.

20. The mobile phone according to claim 14, wherein a ratio of a length of the second radiator to a length of the first radiator is within a range from 1.6 to 2.4.

* * * * *